US012639212B2

(12) United States Patent
Kang et al.

(10) Patent No.: US 12,639,212 B2
(45) Date of Patent: May 26, 2026

(54) DYNAMIC MULTI-HOST RESOURCE ALLOCATION

(71) Applicant: Samsung Electronics Co., Ltd., Suwon-si (KR)

(72) Inventors: Jeong Uk Kang, Suwon-si (KR); Youngil Kim, Suwon-si (KR); In-Su Kim, Suwon-si (KR); Jeongjae Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/822,845

(22) Filed: Sep. 3, 2024

(65) Prior Publication Data

US 2025/0245147 A1     Jul. 31, 2025

(30) Foreign Application Priority Data

Jan. 25, 2024     (KR) ........................ 10-2024-0011892

(51) Int. Cl.
*G06F 12/02*          (2006.01)
(52) U.S. Cl.
CPC ................................ *G06F 12/0246* (2013.01)
(58) Field of Classification Search
CPC ......... G06F 12/0246; G06F 2212/7205; G06F 2212/7208
See application file for complete search history.

(56) References Cited

U.S. PATENT DOCUMENTS

| | | | |
|---|---|---|---|
| 6,895,485 B1 * | 5/2005 | DeKoning | ............ G06F 3/0665 |
| | | | 711/170 |
| 10,452,536 B2 | 10/2019 | Parker et al. | |
| 10,540,274 B2 | 1/2020 | Szubbocsev | |
| 10,929,028 B2 | 2/2021 | Kim et al. | |
| 10,996,867 B2 | 5/2021 | Huang et al. | |
| 11,121,980 B2 | 9/2021 | Ra et al. | |
| 11,669,258 B2 | 6/2023 | Cariello | |
| 2013/0007334 A1 * | 1/2013 | McGinley | ............. G06F 3/0659 |
| | | | 710/316 |

(Continued)

FOREIGN PATENT DOCUMENTS

| | | |
|---|---|---|
| KR | 10-2143086 B1 | 8/2020 |
| KR | 10-2365716 B1 | 2/2022 |
| KR | 10-2492729 B1 | 1/2023 |

*Primary Examiner* — Tasnima Matin
(74) *Attorney, Agent, or Firm* — Fish & Richardson P.C.

(57)          ABSTRACT

Methods of operating a storage device include receiving a first performance requirement from a first host, allocating a 0-th striping group of the nonvolatile memory devices to the first host, based on the first performance requirement, writing first data of the first host in the 0-th striping group, receiving a second performance requirement from a second host, reallocating the nonvolatile memory devices such that a first striping group and a second striping group of the nonvolatile memory devices are allocated to the first host and the second host, based on the first and second performance requirements, and performing a garbage collection operation for the first host. The second striping group includes some of nonvolatile memory devices included in the 0-th striping group, and a first part of the nonvolatile memory devices included in the second striping group stores the first data and is not selected for the garbage collection operation.

20 Claims, 21 Drawing Sheets

(56)  References Cited

U.S. PATENT DOCUMENTS

| | | | | |
|---|---|---|---|---|
| 2014/0304451 | A1* | 10/2014 | Shibayama | G06F 12/0246 |
| | | | | 711/103 |
| 2015/0178010 | A1* | 6/2015 | Chang | G06F 3/064 |
| | | | | 711/170 |
| 2015/0242148 | A1* | 8/2015 | Suzuki | G06F 3/0619 |
| | | | | 711/114 |
| 2018/0024767 | A1* | 1/2018 | Singhai | G06F 16/215 |
| | | | | 711/147 |
| 2018/0260158 | A1* | 9/2018 | Marripudi | G06F 11/34 |
| 2019/0138222 | A1* | 5/2019 | Vallala | G06F 3/0613 |
| 2019/0294339 | A1* | 9/2019 | Bolkhovitin | G06F 3/0607 |
| 2020/0379898 | A1* | 12/2020 | Yang | G11C 11/5628 |
| 2021/0181940 | A1 | 6/2021 | Cui et al. | |
| 2022/0147392 | A1 | 5/2022 | Choi et al. | |
| 2023/0103515 | A1 | 4/2023 | Lee et al. | |
| 2023/0305745 | A1 | 9/2023 | Horspool et al. | |
| 2023/0393742 | A1* | 12/2023 | Karr | G06F 3/0611 |

* cited by examiner

FIG. 2

Degradation due to GC
for data of H1 or H2

NVM14
NVM13

NVM24
NVM23

NVM34
NVM33

NVM44
NVM43

NVM12
NVM11

NVM22
NVM21

NVM32
NVM31

NVM42
NVM41

:Data for H1

:Data for H2

:Data for H3

| Tenant | SIZE | Minimum Performance |
|--------|------|---------------------|
| H1 | S1 | PF_MIN1 |
| H2 | S2 | PF_MIN2 |
| H3 | S3 | PF_MIN3 |

[Performance Requirement]

| Tenant | SIZE | | Minimum Performance | |
|---|---|---|---|---|
| H1 | S1 (4) | | PF_MIN1 (6) | |
| H2 | S2 (6) | | PF_MIN2 (4) | |
| H3 | S3 (2) | | PF_MIN3 (2) | |

:Data for H1
:Data for H2
:Data for H3

FIG. 8C

| Tenant | SIZE | Minimum Performance |
|--------|------|---------------------|
| H1 | S1 (4) | PF_MIN1 (6) |
| H2 | S2 (6) | PF_MIN2 (4) |
| H3 | S3 (2) | PF_MIN3 (2) |

:Data for H1

:Data for H2

:Data for H3

✳ :Traffic Control

SG2

NVM13  NVM14

NVM23  NVM24

NVM33  NVM34

NVM43  NVM44

SG1

NVM11  NVM12

NVM21  NVM22

✳NVM31  ✳NVM32

✳NVM41  ✳NVM42

| Tenant | SIZE | Minimum Performance | Isolation Level |
|--------|------|---------------------|-----------------|
| H1 | S1 | PF_MIN1 | LV_ISO1 |
| H2 | S2 | PF_MIN2 | LV_ISO2 |
| H3 | S3 | PF_MIN3 | LV_ISO3 |

[Performance Requirement]

| Tenant | SIZE | Minimum Performance | Isolation Level |
|---|---|---|---|
| H1 | S1 (4) | PF_MIN1 (6) | LV_IS01 [H] |
| H2 | S2 (6) | PF_MIN2 (4) | LV_IS02 [L] |
| H3 | S3 (2) | PF_MIN3 (2) | LV_IS03 [H] |

:Data for H1
:Data for H2
:Data for H3

| Tenant | SIZE | Minimum Performance | Isolation Level |
|---|---|---|---|
| H1 | S1 (4) | PF_MIN1 (6) | LV_IS01 [H] |
| H2 | S2 (6) | PF_MIN2 (4) | LV_IS02 [L] |
| H3 | S3 (2) | PF_MIN3 (2) | LV_IS03 [L] |

:Data for H1

:Data for H2

:Data for H3

※ :Traffic Control

| Tenant | SIZE | Minimum Performance | Isolation Level |
|--------|------|---------------------|-----------------|
| H1 | S1 | PF_MIN1 | LV_ISO1 [H] |
| H2 | S2 | PF_MIN2 | LV_ISO2 [L] |
| H3 | S3 | PF_MIN3 | LV_ISO3 [H] |

: GC Group

: Data for H1

: Data for H2

: Data for H3

| Tenant | SIZE | Minimum Performance | Isolation Level |
|---|---|---|---|
| H1 | S1 (4) | PF_MIN1 (6) | LV_ISO1 [H] |
| H2 | S2 (6) | PF_MIN2 (4) | LV_ISO2 [L] |
| H3 | S3 (2) | PF_MIN3 (2) | LV_ISO2 [H] |

:Data for H1
:Data for H2
:Data for H3

| Tenant | SIZE | Minimum Performance | Isolation Level |
|---|---|---|---|
| H1 | S1 (4) | PF_MIN1 (6) | LV_ISO1 [H] |
| H2 | S2 (6) | PF_MIN2 (4) | LV_ISO2 [L] |
| H3 | S3 (2) | PF_MIN3 (2) | LV_ISO2 [H] |

: Data for H1
: Data for H2
: Data for H3

| Tenant | SIZE | Minimum Performance | | Isolation Level |
|---|---|---|---|---|
| H1 | S1 (4) | PF_MIN1 (6) | | LV_ISO1 [H] |
| H2 | S2 (6) | PF_MIN2 (4) | | LV_ISO2 [L] |
| H3 | S3 (2) | PF_MIN3 (2) | | LV_ISO2 [H] |

▨ :Data for H1
▧ :Data for H2
▦ :Data for H3

| Tenant | SIZE | Minimum Performance | Isolation Level |
|--------|--------|---------------------|-----------------|
| H1 | S1 (4) | PF_MIN1 (6) | LV_ISO1 [H] |
| H2 | S2 (6) | PF_MIN2 (4) | LV_ISO2 [L] |
| H3 | S3 (2) | PF_MIN3 (2) | LV_ISO2 [H] |

DYNAMIC MULTI-HOST RESOURCE ALLOCATION

CROSS-REFERENCE TO RELATED APPLICATIONS

This application claims priority under 35 U.S.C. § 119 to Korean Patent Application No. 10-2024-0011892 filed on Jan. 25, 2024, in the Korean Intellectual Property Office, the disclosures of which are incorporated by reference herein in their entireties.

BACKGROUND

Example embodiments of the present disclosure described herein relate to semiconductor memory devices, and more particularly, relate to storage devices and operation methods thereof.

A semiconductor memory is classified as a volatile memory, which loses data stored therein when a power is turned off, such as a static random access memory (SRAM) or a dynamic random access memory (DRAM) or a non-volatile memory, which retains data stored therein even when a power is turned off, such as a flash memory, a phase-change RAM (PRAM), a magnetic RAM (MRAM), a resistive RAM (RRAM), or a ferroelectric RAM (FRAM).

A flash memory-based high-capacity storage medium communicates with an external device by using a high-speed interface. Nowadays, a multi-host storage system in which a single storage medium supports a plurality of hosts or a plurality of tenants is being developed. In general, when the plurality of hosts access the single storage medium, physical resources of the single storage medium is limited, which causes the reduction of performance of each host.

SUMMARY

Example embodiments of the present disclosure may provide storage devices with improved performance and operation methods thereof.

According to some example embodiments, an operation method of a storage device which includes a plurality of nonvolatile memory devices includes receiving a first performance requirement from a first host, allocating a 0-th striping group of the plurality of nonvolatile memory devices to the first host, based on the first performance requirement, writing first data of the first host in the 0-th striping group, in response to a first write request of the first host, receiving a second performance requirement from a second host, reallocating the plurality of nonvolatile memory devices such that a first striping group of the plurality of nonvolatile memory devices is allocated to the first host and a second striping group of the plurality of nonvolatile memory devices is allocated to the second host, based on the first performance requirement and the second performance requirement, and performing a garbage collection operation for the first host. The second striping group includes at least some of nonvolatile memory devices included in the 0-th striping group, and a first part of the nonvolatile memory devices included in the second striping group stores the first data of the first host and the first part storing the first data is not selected as a target of the garbage collection operation for the first host.

According to some example embodiments, an operation method of a storage device which includes a plurality of nonvolatile memory devices includes receiving a first write request from a first host, writing first data of the first host in first nonvolatile memory devices among the plurality of nonvolatile memory devices in response to the first write request, receiving a second write request from a second host, writing second data of the second host in second nonvolatile memory devices among the plurality of nonvolatile memory devices in response to the second write request, and performing a garbage collection operation for the first host. The second nonvolatile memory devices include at least some of the first nonvolatile memory devices. During the garbage collection operation of the first host, the at least some of the first nonvolatile memory devices included in the second nonvolatile memory devices are not selected as a target of the garbage collection operation.

According to some example embodiments, a storage device includes a plurality of nonvolatile memory devices, and a storage controller that controls the plurality of nonvolatile memory devices. The storage controller includes a host interface circuit that communicates with a plurality of hosts, a NAND interface circuit that communicates with the plurality of nonvolatile memory devices, and a resource manager that allocates the plurality of nonvolatile memory devices to the plurality of hosts. The resource manager receives a first performance requirement from a first host among the plurality of hosts, and allocates a 0-th striping group of the plurality of nonvolatile memory devices to the first host, based on the first performance requirement. The resource manager receives a second performance requirement from a second host among the plurality of hosts, and reallocates the plurality of nonvolatile memory devices such that a first striping group of the plurality of nonvolatile memory devices are allocated to the first host and a second striping group of the plurality of nonvolatile memory devices are allocated to the second host, based on the first performance requirement and the second performance requirement. The second striping group includes at least some of nonvolatile memory devices included in the 0-th striping group, and a first part of the nonvolatile memory devices included in the second striping group stores first data of the first host and is not selected as a target of a garbage collection operation for the first host.

BRIEF DESCRIPTION OF THE FIGURES

The above and other objects and features of the present disclosure will become apparent by describing in detail some example embodiments thereof with reference to the accompanying drawings.

FIG. 2 is a block diagram illustrating a storage controller of FIG. 1.

FIG. 6 is a diagram for describing a resource manager of a storage controller of FIG. 2.

FIG. 7 is a diagram for describing a performance requirement received from a plurality of hosts of FIG. 1.

FIGS. 8A to 8C are diagrams for describing an operation of a storage device according to the flowchart of FIG. 5.

FIG. 9 is a diagram for describing performance requirements received from a plurality of hosts of FIG. 1.

DETAILED DESCRIPTION

Below, some example embodiments of the present disclosure will be described in detail and clearly to such an extent that an ordinary one in the art easily carries out the present disclosure.

Figure 1:
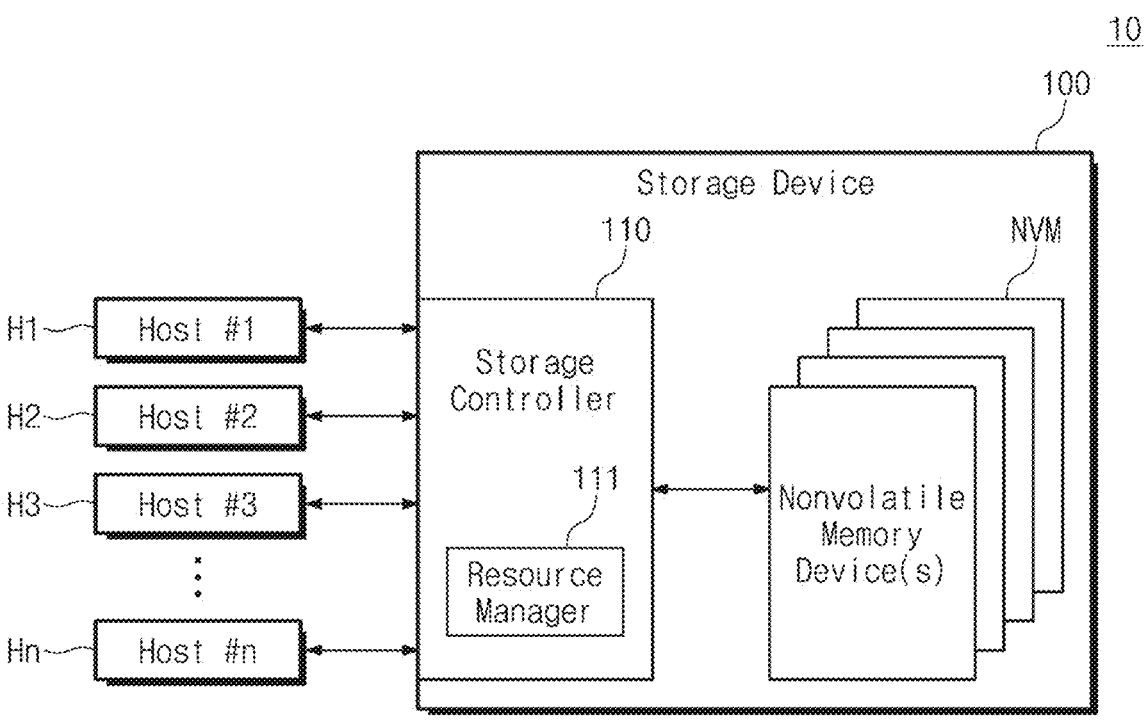
FIG. 1 is a block diagram illustrating a storage system according to some example embodiments of the present disclosure.

FIG. 1 is a block diagram illustrating a storage system according to some example embodiments of the present disclosure. Referring to FIG. 1, a storage system 10 may include a plurality of hosts H1 to Hn and a storage device 100. In some example embodiments, the storage system 10 may include at least one of various information processing devices such as a personal computer, a laptop computer, a server, a workstation, a smartphone, a tablet PC, etc. Alternatively, the storage system 10 may be a data center configured to store and manage various data or a storage server or application server included in the data center.

The plurality of hosts H1 to Hn may be configured to access the storage device 100. In some example embodiments, each of the plurality of hosts H1 to Hn may be a computing node configured to operate independently. In some example embodiments, the plurality of hosts H1 to Hn may be single core processors or multi-core processors respectively included in different computing nodes (or computing systems). Alternatively, at least some of the plurality of hosts H1 to Hn may be different processors included in the same computing node (or computing system). As another example, the plurality of hosts H1 to Hn may be processors configured to process different applications. As another example, each of the plurality of hosts H1 to Hn may be a virtual machine which is driven independently or individually.

The storage device 100 may operate under control of each of the plurality of hosts H1 to Hn. For example, the storage device 100 may include a storage controller 110 and nonvolatile memory devices NVM. Under control of each of the plurality of hosts H1 to Hn, the storage controller 110 may store data in the nonvolatile memory devices NVM or may provide data stored in the nonvolatile memory devices NVM to each of the plurality of hosts H1 to Hn.

In some example embodiments, the storage device 100 may be a single storage or single storage device configured to support multiple hosts or multiple tenants. For example, each of the plurality of hosts H1 to Hn may be a tenant configured to operate independently or individually, and the plurality of hosts H1 to Hn may share the storage device 100. That is, the storage system 10 may include a multi-tenant environment.

Each of the plurality of hosts H1 to Hn configured to access the storage device 100 independently of each other may require specific performance of the storage device 100 depending on a type or an operation method thereof. However due to the limitation on the physical resource of the storage device 100, under a specific condition, the storage device 100 may fail to support the specific performance required for each of the hosts H1 to Hn. For example, when a specific host occupies all or most of physical resources of the storage device 100 or when various maintenance operations are performed in the storage device 100, the storage device 100 may fail to support the performance required by some hosts.

The storage device 100 according to some example embodiments of the present disclosure may be configured to distribute the physical resources into the plurality of hosts H1 to Hn. For example, the storage controller 110 may include a resource manager 111. The resource manager 111 may be configured to allocate the physical resources of the storage device 100 to each of the plurality of hosts H1 to Hn, based on a performance requirement of each of the plurality of hosts H1 to Hn. In this case, because physical resources respectively used or occupied by the plurality of hosts H1 to Hn are separated from each other, performance interference between the plurality of hosts H1 to Hn may be prevented or reduced in likelihood. In some example embodiments, the resource manager 111 may dynamically reconfigure the physical resource for each of the plurality of hosts H1 to Hn. The operation of the storage device 100 according to some example embodiments of the present disclosure will be described in detail with reference to the following drawings.

Figure 2:
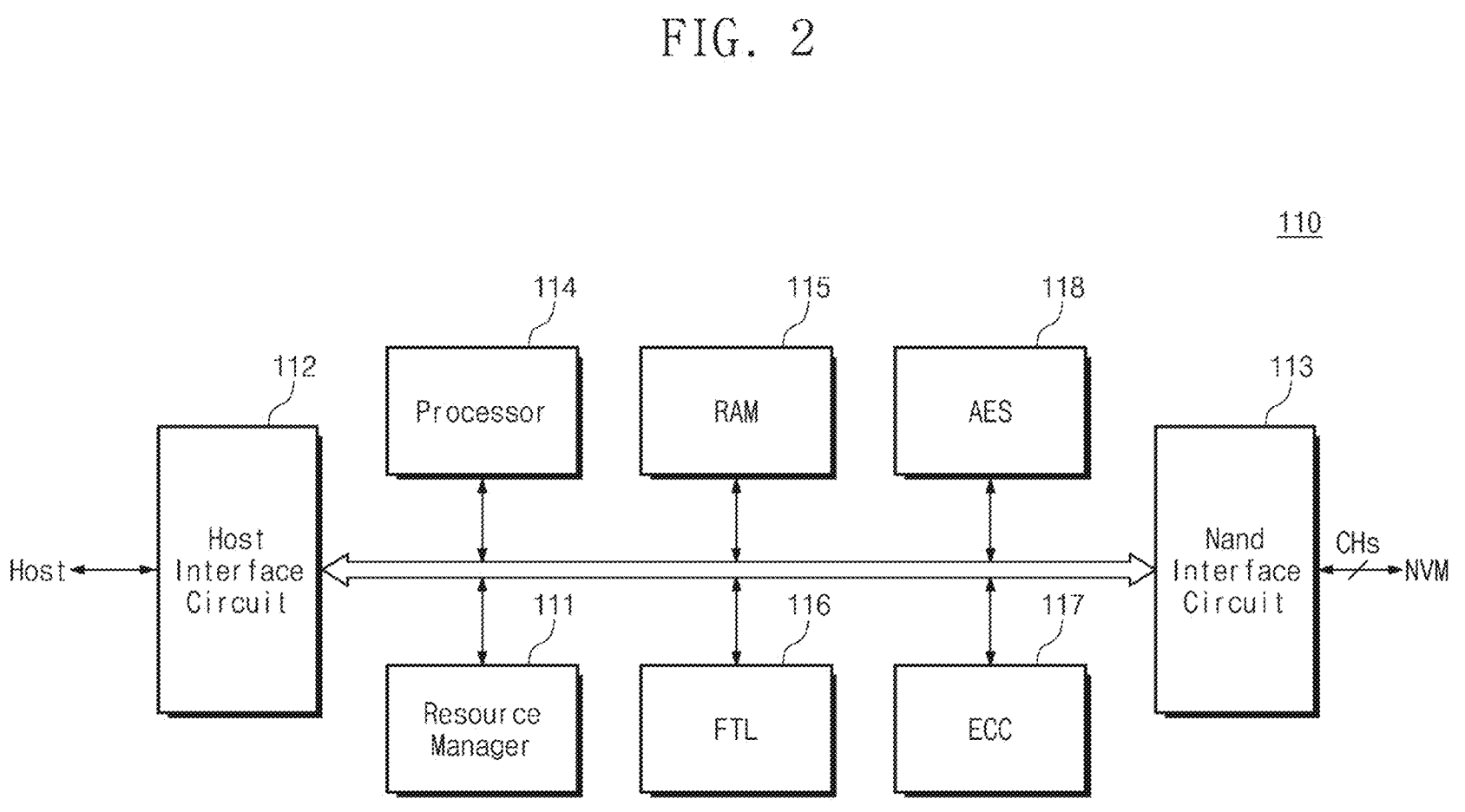

FIG. 2 is a block diagram illustrating a storage controller of FIG. 1. Referring to FIGS. 1 and 2, the storage controller 110 may include the resource manager 111, a host interface circuit 112, a NAND interface circuit 113, a processor 114, a random access memory (RAM) 115, a flash translation layer (FTL) 116, an error correction code (ECC) engine 117, and an advanced encryption standard (AES) engine 118. The configuration of the storage controller 110 illustrated in FIG. 2 is provided as an example, and the present disclosure is not limited thereto. The storage controller 110 may include any other components.

The resource manager 111 may be configured to allocate physical resources of the storage device 100 to the plurality of hosts H1 to Hn sharing the storage device 100. For example, based on a performance requirement of each of the plurality of hosts H1 to Hn, the resource manager 111 may allocate the physical resources of the storage device 100 such that performance interference is not caused between the plurality of hosts H1 to Hn. The operation of the resource manager 111 will be described in detail with reference to the following drawings.

The host interface circuit 112 may communicate with the plurality of hosts H1 to Hn through a host interface. The host interface may include a peripheral component interconnect (PCI) express interface or a PCI express-based nonvolatile memory express (NVMe) interface. However, the present disclosure is not limited thereto. For example, the host interfaces may include at least one of various host interfaces such as a serial ATA (SATA) interface, a serial attached SCSI (SAS) interface, a universal flash storage (UFS) interface, and a compute express link (CXL) interface.

The NAND interface circuit 113 may communicate with the plurality of nonvolatile memory devices NVM through a plurality of channels CHs. In some example embodiments, the NAND interface circuit 113 may be implemented to comply with the standard such as Toggle or an open NAND flash interface (ONFI).

The processor 114 may be configured to control an overall operation of the storage controller 110. For example, the processor 114 may execute various applications on the storage controller 110. The RAM 115 may be configured to store various information necessary for the storage controller 110 to operate. In some example embodiments, the RAM 115 may be used as a buffer memory, a working memory, or a cache memory of the storage controller 110. In some example embodiments, the resource manager 111 or the FTL 116 may be implemented in the form of software, hardware, or a combination thereof. When the resource manager 111 or the FTL 116 is implemented in the form of software, information associated with the resource manager 111 or the FTL 116 may be stored in the RAM 115 so as to be executed by the processor 114.

The FTL 116 may perform various maintenance operations for efficiently managing or using the nonvolatile memory devices NVM. The maintenance operations may include operations such as an address mapping operation, a wear-leveling operation, and a garbage collection operation.

The address mapping operation of the FTL 116 refers to an operation of translating logical addresses received from the plurality of hosts H1 to Hn into physical addresses to be used to actually store data in the nonvolatile memory devices NVM. In some example embodiments, the FTL 116 may perform the address mapping operation by using L2P map data.

The wear-leveling operation of the FTL 116 may refer to an operation of preventing or reducing in likelihood excessive degradation of a specific memory block among memory blocks included in the nonvolatile memory devices NVM. For example, the FTL 116 may allocate the memory blocks included in the nonvolatile memory devices NVM so as to be used uniformly, and thus, the excessive degradation of the specific memory block may be prevented or reduced in likelihood. The wear-leveling operation of the FTL 116 may be implemented through a firmware technology for balancing erase counts of the memory blocks of the nonvolatile memory devices NVM.

The garbage collection operation of the FTL 116 may refer to an operation of securing a memory block or a capacity available in the nonvolatile memory devices NVM by copying valid data of a source memory block to a target memory block and erasing the source memory block or switching the source memory block into a free block.

The FTL 116 may further perform various management operations, such as a bad block management operation, in addition to the above operations. In an example embodiment, some or all of the functions of the FTL 116 may be implemented through software, hardware, or a combination thereof.

The ECC engine 117 may detect and correct an error of data read from the nonvolatile memory devices NVM. For example, the ECC engine 117 may generate parity bits by performing ECC encoding for write data to be written in the nonvolatile memory devices NVM. The generated parity bits may be stored in the nonvolatile memory devices NVM together with the write data. In the read operation of the nonvolatile memory devices NVM, the ECC engine 117 may correct the error of the read data by performing ECC decoding based on the read data and the parity bits read from the nonvolatile memory devices NVM.

The AES engine 118 may perform at least one of an encryption operation and a decryption operation on data input to the storage controller 110 by using a symmetric-key algorithm.

Figure 3:
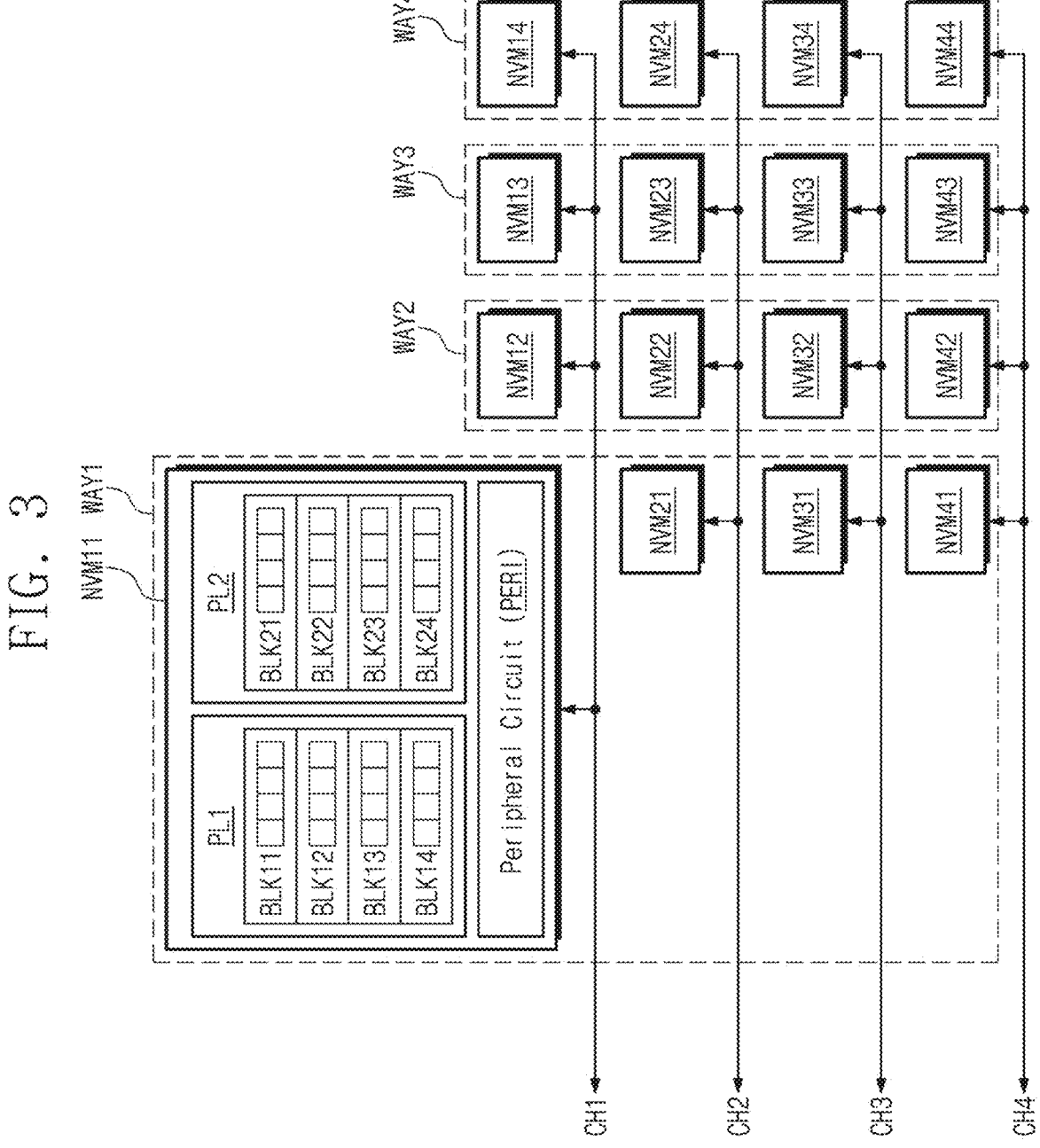
FIG. 3 is a diagram illustrating nonvolatile memory devices of FIG. 1.

FIG. 3 is a diagram illustrating nonvolatile memory devices of FIG. 1. Referring to FIGS. 1 and 3, the storage device 100 may include a plurality of nonvolatile memory devices NVM11 to NVM44. Each of the plurality of nonvolatile memory devices NVM11 to NVM44 may be implemented with one semiconductor chip, one semiconductor die, or one semiconductor package.

The nonvolatile memory device NVM11 may include a plurality of planes PL1 and PL2 and a peripheral circuit PERI. The plane PL1 may include a plurality of memory blocks BLK11 to BLK14, and the plane PL2 may include a plurality of memory blocks BLK21 to BLK24. Each of the plurality of memory blocks BLK11 to BLK14 and BLK21 to BLK24 may include a plurality of pages. In some example embodiments, memory blocks (e.g., BLK11 to BLK14) included in the same plane (e.g., PL1) may be configured to share the same bit lines, but the present disclosure is not limited thereto. In some example embodiments, the plurality of planes PL1 and PL2 of the nonvolatile memory device NVM11 may operate independently of each other or in parallel.

The peripheral circuit PERI of the nonvolatile memory device NVM11 may be connected to a corresponding channel (e.g., CH1) among a plurality of channels CH1 to CH4. In response to various signals received through the corresponding channel, the peripheral circuit PERI may store data received through the corresponding channel in the plurality of planes PL1 and PL2 or may output data stored in the plurality of planes PL1 and PL2 through the corresponding channel. For the above operations, the peripheral circuit PERI may include various components such as an address decoder, a voltage generator, a page buffer circuit, an input/output circuit, and/or a control logic circuit.

For brevity of drawing, an example in which one nonvolatile memory device NVM11 includes two planes PL1 and PL2 and one plane includes four memory blocks is illustrated, but the present disclosure is not limited thereto. In the nonvolatile memory device NVM11, the number of planes, the number of memory blocks, or the number of pages may be variously changed and modified. In some example embodiments, structures of the nonvolatile memory devices NVM12 to NVM44 are similar to the structure of the nonvolatile memory device NVM11, and thus, additional description will be omitted to avoid redundancy.

The plurality of nonvolatile memory devices NVM11 to NVM44 may communicate with the storage controller 110 through the plurality of channels CH1 to CH4. The plurality of nonvolatile memory devices NVM11 to NVM44 may constitute a plurality of ways WAY1 to WAY4.

For example, in the plurality of nonvolatile memory devices NVM11 to NVM44, a first part of nonvolatile memory devices NVM11, NVM12, NVM13, and NVM14 may communicate with the storage controller 110 through the first channel CH1, a second part of the nonvolatile memory devices NVM21, NVM22, NVM23, and NVM24 may communicate with the storage controller 110 through the second channel CH2, a third part of nonvolatile memory devices NVM31, NVM32, NVM33, and NVM34 may communicate with the storage controller 110 through the third channel CH3, and a fourth part of nonvolatile memory devices NVM41, NVM42, NVM43, and NVM44 may communicate with the storage controller 110 through the fourth channel CH4. In the plurality of nonvolatile memory devices NVM11 to NVM44, a fifth part of nonvolatile memory devices NVM11, NVM21, NVM31, and NVM41 may constitute the first way WAY1, a sixth part of nonvolatile memory devices NVM12, NVM22, NVM32, and NVM42 may constitute the second way WAY2, a seventh part of nonvolatile memory devices NVM13, NVM23, NVM33, and NVM43 may constitute the third way WAY3, and an eighth part of nonvolatile memory devices NVM14, NVM24, NVM34, and NVM44 may constitute the fourth way WAY4. That is, the storage device 100 may have a multi-way/multi-channel structure. In some example embodiments, the 4-channel and 4-way structure is described with reference to FIG. 3, but the present disclosure is not limited thereto. For example, it may be understood that the number of ways or the number of channels may be variously changed and modified.

In some example embodiments, the physical resources of the storage device 100 may include various components. For example, the physical resources of the storage device 100 may indicate the nonvolatile memory devices NVM11 to NVM44 included in the storage device 100. Alternatively, the physical resources of the storage controller 110 may indicate a buffer memory (e.g., a DRAM) of the storage device 100. As another example, the physical resources of the storage device 100 may be associated with an operation speed of the storage device 100. As another example, the physical resources of the storage device 100 may include various hardware components included in the storage controller 110.

Below, to describe some example embodiments of the present disclosure easily, it is assumed that the physical resources of the storage device 100 are the nonvolatile memory devices NVM11 to NVM44 or memory blocks included in the nonvolatile memory devices NVM11 to NVM44. However, the present disclosure is not limited thereto. For example, the physical resources of the storage device 100 may include various components associated with the performance of the storage device 100.

Figure 4:
FIG. 4 is a diagram for describing resource allocation of a storage device of FIG. 1.

FIG. 4 is a diagram for describing resource allocation of a storage device of FIG. 1. For brevity of drawing, the structure of the channels CH1 to CH4 connected to the nonvolatile memory devices NVM11 to NVM44 is omitted. However, the present disclosure is not limited thereto. For example, the nonvolatile memory devices NVM11 to NVM44 illustrated below may have the structure or connection relationship described with reference to FIG. 3.

Referring to FIGS. 1 and 4, the first to third hosts H1 to H3 may access the storage device 100. In this case, the storage device 100 may allocate physical resources to the first to third hosts H1 to H3.

For example, as illustrated in FIG. 4, the storage device 100 may allocate the nonvolatile memory devices NVM11, NVM12, NVM21, NVM22, NVM31, NVM32, NVM41, and NVM42 as the physical resource for the first host H1. In this case, data of the first host H1 may be written in the nonvolatile memory devices NVM11, NVM12, NVM21, NVM22, NVM31, NVM32, NVM41, and NVM42. The storage device 100 may allocate the nonvolatile memory devices NVM13, NVM14, NVM23, NVM24, NVM33, NVM34, NVM43, and NVM44 as the physical resource for the second host H2. In this case, data of the second host H2 may be written in the nonvolatile memory devices NVM13, NVM14, NVM23, NVM24, NVM33, NVM34, NVM43, and NVM44. The storage device 100 may allocate the nonvolatile memory devices NVM21, NVM22, NVM23, and NVM24 as the physical resource for the third host H3.

In this case, data of the third host H3 may be written in the nonvolatile memory devices NVM21, NVM22, NVM23, and NVM24.

In some example embodiments, to optimize or improve performance, the storage device 100 may operate while managing memory blocks of different nonvolatile memory devices as one logical object. For example, to store write data received from the first host H1, the storage device 100 may constitute memory blocks respectively included in the nonvolatile memory devices NVM11, NVM12, NVM21, NVM22, NVM31, NVM32, NVM41, an NVM42 as one logical object. The logical object may be called a super block.

In some example embodiments, any other host may experience performance interference due to an operation for a specific host. For example, when physical resources are allocated as illustrated in FIG. 4, due to the access of the first host H1, the garbage collection operation may be caused in the nonvolatile memory devices NVM11, NVM12, NVM21, NVM22, NVM31, NVM32, NVM41, and NVM42 allocated to the first host H1. In this case, because the nonvolatile memory devices NVM21 and NVM22 are allocated to the third host H3, the access of the third host H3 may be restricted due to the garbage collection operation caused by the access of the first host H1. That is, a speed at which the storage device 100 provides a service to the third host H3 may decrease.

Figure 5:
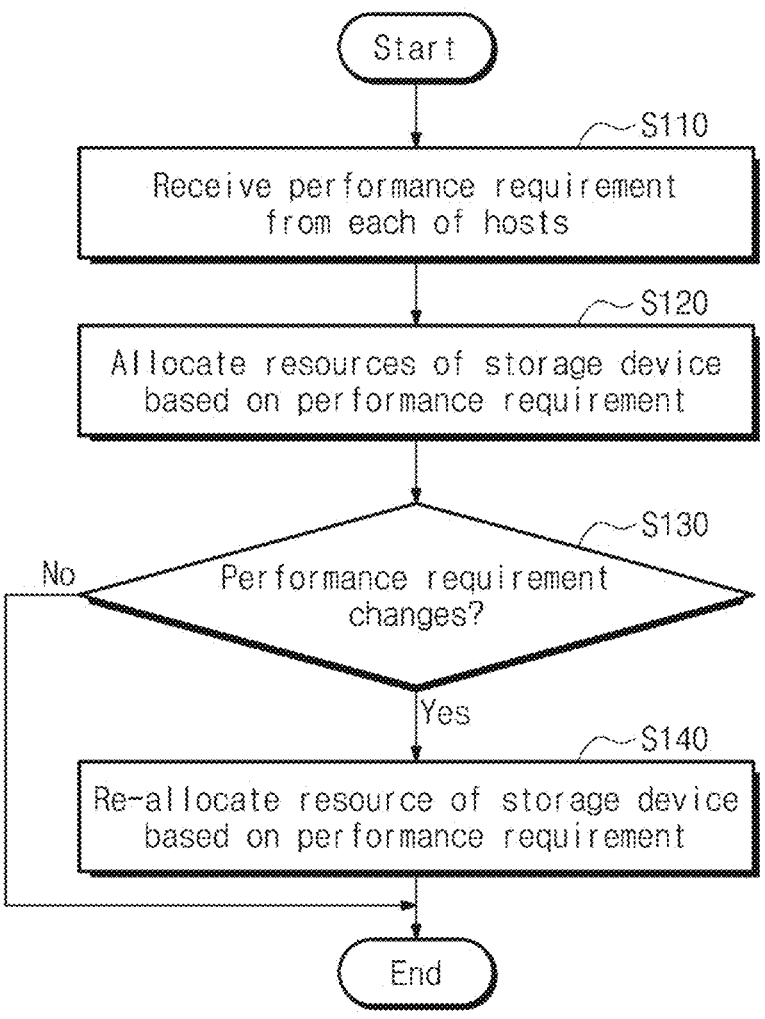
FIG. 5 is a flowchart illustrating an operation of a storage device of FIG. 1.

FIG. 5 is a flowchart illustrating an operation of a storage device of FIG. 1. Referring to FIGS. 1 and 5, in operation S110, the storage device 100 may receive information about performance requirement from each of the plurality of hosts H1 to Hn, and hereinafter, for convenience of description, the information about performance requirement is referred to as a "performance requirement". For example, the plurality of hosts H1 to Hn may require different performance or different capacities. The performance requirement may include information about performance, minimum performance (e.g. minimum desired performance), maximum performance (e.g. maximum desired performance), or a capacity necessary for each of the plurality of hosts H1 to Hn. In some example embodiments, the performance requirement may be provided from the plurality of hosts H1 to Hn to the storage device 100 in the process of initializing the storage device 100. Alternatively, when there is a need to change performance for each of the plurality of hosts H1 to Hn, the performance requirement may be provided to the storage device 100. Alternatively, when a new host is added to the storage system 10, the performance requirement may be transmitted from the new host to the storage device 100.

In operation S120, the storage device 100 may allocate physical resources of the storage device 100 to the plurality of hosts H1 to Hn, based on the performance requirement. For example, based on the performance requirement of each of the plurality of hosts H1 to Hn, the resource manager 111 of the storage controller 110 may allocate the physical resources to the plurality of hosts H1 to Hn such that performance interference is not caused between the plurality of hosts H1 to Hn. As an example, it is assumed that the physical resource indicates the plurality of nonvolatile memory devices NVM11 to NVM44. In this case, the resource manager 111 may allocate a first part of the plurality of nonvolatile memory devices NVM11 to NVM44 to the first host H1 such that a first performance requirement (e.g., first minimum performance and a first capacity) of the first host H1 is satisfied. The resource manager 111 may allocate a second part of the plurality of nonvolatile memory devices NVM11 to NVM44 to the second host H2 such that a second performance requirement (e.g., second minimum performance and a second capacity) of the second host H2 is satisfied. In this case, the first part and the second part of the plurality of nonvolatile memory devices NVM11 to NVM44 may not overlap each other. That is, the first and second hosts H1 and H2 may not or may be less likely to experience performance interference.

For convenience of description, physical resources (e.g., nonvolatile memory devices) allocated to a specific host is called a "striping group". For example, the storage device 100 may allocate a first striping group to the first host H1; in this case, the first striping group may include a first part of nonvolatile memory devices. That is, based on the performance requirement of each of the plurality of hosts H1 to Hn, the storage device 100 may generate a plurality of striping groups and may allocate the plurality of striping groups to the plurality of hosts H1 to Hn, respectively.

In operation S130, the storage device 100 may determine whether the performance requirement changes. For example, while operating, each of the plurality of hosts H1 to Hn may change the performance requirement. The changed performance requirement may be provided to the storage device 100. Alternatively, a new host may be added to the storage system 10. In this case, a new performance requirement may be provided from the new host to the storage device 100. Alternatively, some hosts may be removed from the storage system 10. In this case, the performance requirement of each of the remaining hosts may change, and the changed performance requirement of each of the remaining hosts may be provided to the storage device 100. When the performance requirement does not change, the storage device 100 may not perform an additional operation.

When the performance requirement changes, in operation S140, the storage device 100 may reallocate the resource of the storage device 100 to the plurality of hosts H1 to Hn, based on the performance requirement. For example, the resource manager 111 of the storage controller 110 may reallocate or reconfigure the plurality of striping groups allocated to the plurality of hosts H1 to Hn, based on the changed performance requirement. That is, the resource manager 111 of the storage controller 110 may reallocate resources of the storage device 100 to the plurality of hosts H1 to Hn. In this case, the resources respectively allocated to the plurality of hosts H1 to Hn may not overlap each other. This may mean that the performance interference between the plurality of hosts H1 to Hn is prevented or reduced in likelihood. How to allocate or reallocate resources to the plurality of hosts H1 to Hn will be described in detail with reference to the following drawings.

As described above, the storage device 100 may dynamically allocate, configure, reallocate, or reconfigure resources to the plurality of hosts H1 to Hn, based on the performance requirement for each of the plurality of hosts H1 to Hn. In this case, the minimum performance required for each of the plurality of hosts H1 to Hn may be guaranteed or provided, and the performance interference between the plurality of hosts H1 to Hn may be prevented or reduced in likelihood.

Figure 6:
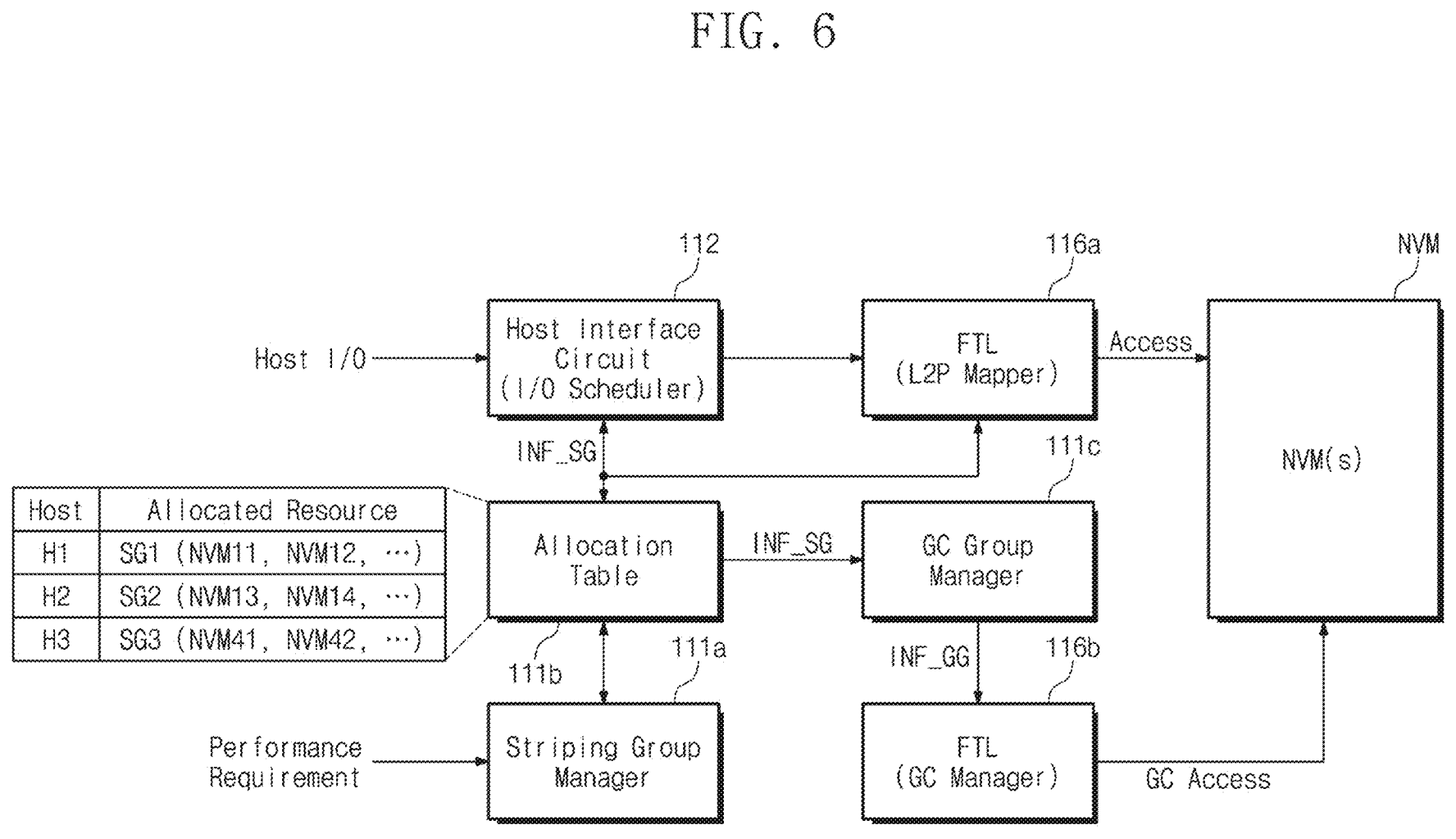

FIG. 6 is a diagram for describing a resource manager of a storage controller of FIG. 2. For convenience of description, components that are unnecessary to describe the resource manager 111 will be omitted. Referring to FIGS. 1, 2, and 6, the resource manager 111 may include a striping group manager 111a, an allocation table 111b, and a GC group manager 111c.

The striping group manager 111a may manage physical resources of the storage device 100 by using striping groups and may allocate the striping groups to the plurality of hosts H1 to Hn. In some example embodiments, the striping group may indicate a resource allocated to each of the plurality of hosts H1 to Hn. For example, a first striping group SG1 may be allocated to the first host H1, and the first striping group SG1 may include resources such as the nonvolatile memory devices NVM11 and NVM12. The striping group manager 111a may manage a plurality of striping groups SG respectively allocated to the plurality of hosts H1 to Hn, based on the performance requirement received from each of the plurality of hosts H1 to Hn.

The allocation table 111b may store and manage striping group information INF_SG. The striping group information INF_SG may include information about resources (or striping groups) allocated to the plurality of hosts H1 to Hn. For example, first to third striping groups SG1 to SG3 may be respectively allocated to the first to third hosts H1 to H3. In this case, the first striping group SG1 may include resources such as the nonvolatile memory devices NVM11 and NVM12, a second striping group SG2 may include resources such as the nonvolatile memory devices NVM13 and NVM14, and a third striping group SG3 may include resources such as the nonvolatile memory devices NVM41 and NVM42.

The GC group manager 111c may generate GC group information INF_GG, based on the striping group information INF_SG from the allocation table 111b. The GC group information INF_GG may include information indicating resources or a range targeted for the garbage collection operation, for each of the plurality of hosts H1 to Hn. For example, the striping groups SG may be dynamically reallocated or reconfigured depending on the configuration of the storage system 10. In this case, data of a specific host (e.g., H1) may be stored in a resource allocated to any other host. According to the present disclosure, in the case where the garbage collection operation associated with the specific host (e.g., H1) is performed, the GC group manager 111c may set a garbage collection group such that the resource allocated to any other host is not selected as a target of the garbage collection operation (e.g., as a GC source). The above components included in the resource manager 111 will be described in detail with reference to the following drawings.

The host interface circuit 112 may process a host I/O based on the striping group information INF_SG from the allocation table 111b. For example, based on the striping group information INF_SG, the host interface circuit 112 may sequentially fetch host I/Os (or input/output requests or access requests) from the plurality of hosts H1 to Hn. In some example embodiments, the host interface circuit 112 may operate as an I/O scheduler.

An FTL 116a may perform the address mapping operation based on the striping group information INF_SG from the allocation table 111b. For example, the host I/O may include a logical address. The FTL 116a may translate a logical address of a host I/O received from the host interface circuit 112 into a physical address of a corresponding resource. In some example embodiments, the FTL 116a may operate as an L2P mapper. The access to the nonvolatile memory device NVM may be performed based on the physical address translated by the FTL 116a. An FTL 116b may perform the garbage collection operation based on the GC group information INF_GG from the GC group manager 111c. In some example embodiments, the FTL 116b may operate as a garbage collection manager.

FIG. 7 is a diagram for describing a performance requirement received from a plurality of hosts of FIG. 1. For convenience of description, performance requirements of the first to third hosts H1 to H3 will be described. However, the present disclosure is not limited thereto.

As illustrated in FIG. 7, the first to third hosts H1 to H3 may have different performance requirements. For example, a first performance requirement of the first host H1 may include information about a first size S1 and first minimum performance PF_MIN1. A second performance requirement of the second host H2 may include information about a second size S2 and second minimum performance PF_MIN2. A third performance requirement of the third host H3 may include information about a third size S3 and third minimum performance PF_MIN3.

In some example embodiments, the size of the performance requirement may indicate the size of a storage space required by a relevant host. For example, when the first host H1 requires the first size S1, the storage device 100 may allocate or provide a swap space of the first size S1 or more to the first host H1. That is, as the size of the performance requirement increases, the number of resources (e.g., nonvolatile memory devices) to be allocated to a relevant host may increase.

In some example embodiments, the minimum performance of the performance requirement may indicate minimum performance required by a relevant host. For example, when the first host H1 requires the first minimum performance PF_MIN1, the storage device 100 may allocate a resource to the first host H1 such that operation performance (e.g., a read latency, a write latency, and an input/output speed) to be served to the first host H1 satisfies at least the first minimum performance PF_MIN1. As an example, operation performance to be served to a host may vary depending on the number of resources to be allocated or a configuration of the resources. For example, it is assumed that the first minimum performance PF_MIN1 of the first host H1 is "6" and one nonvolatile memory device supports performance of "1". In this case, the performance of "6" may be supported when six nonvolatile memory devices perform a parallel operation. Accordingly, to satisfy the first minimum performance PF_MIN1 of the first host H1, the storage device 100 may set a resource such that the first striping group SG1 allocated to the first host H1 includes at least six nonvolatile memory devices.

Figure 8A:
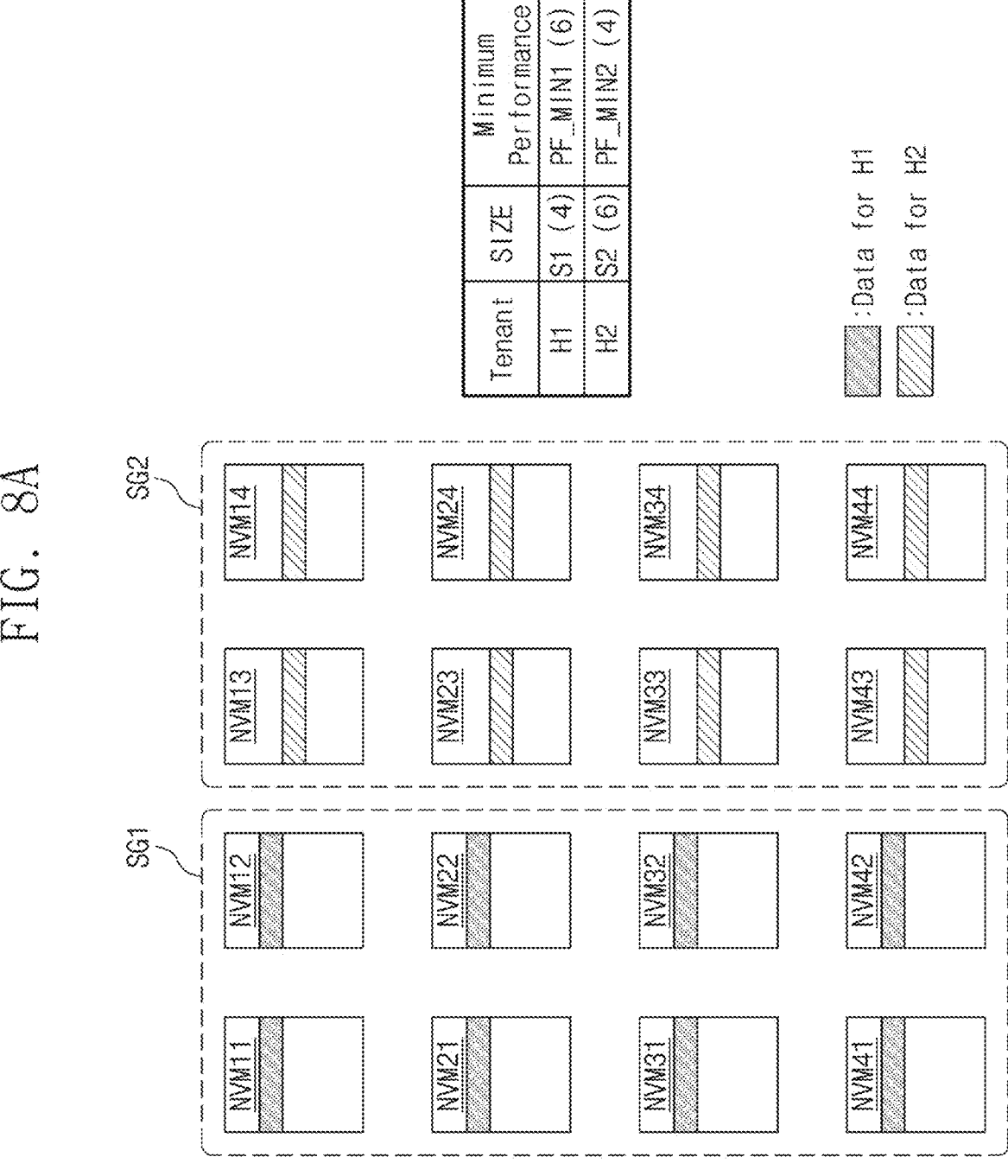
Figure 8B:
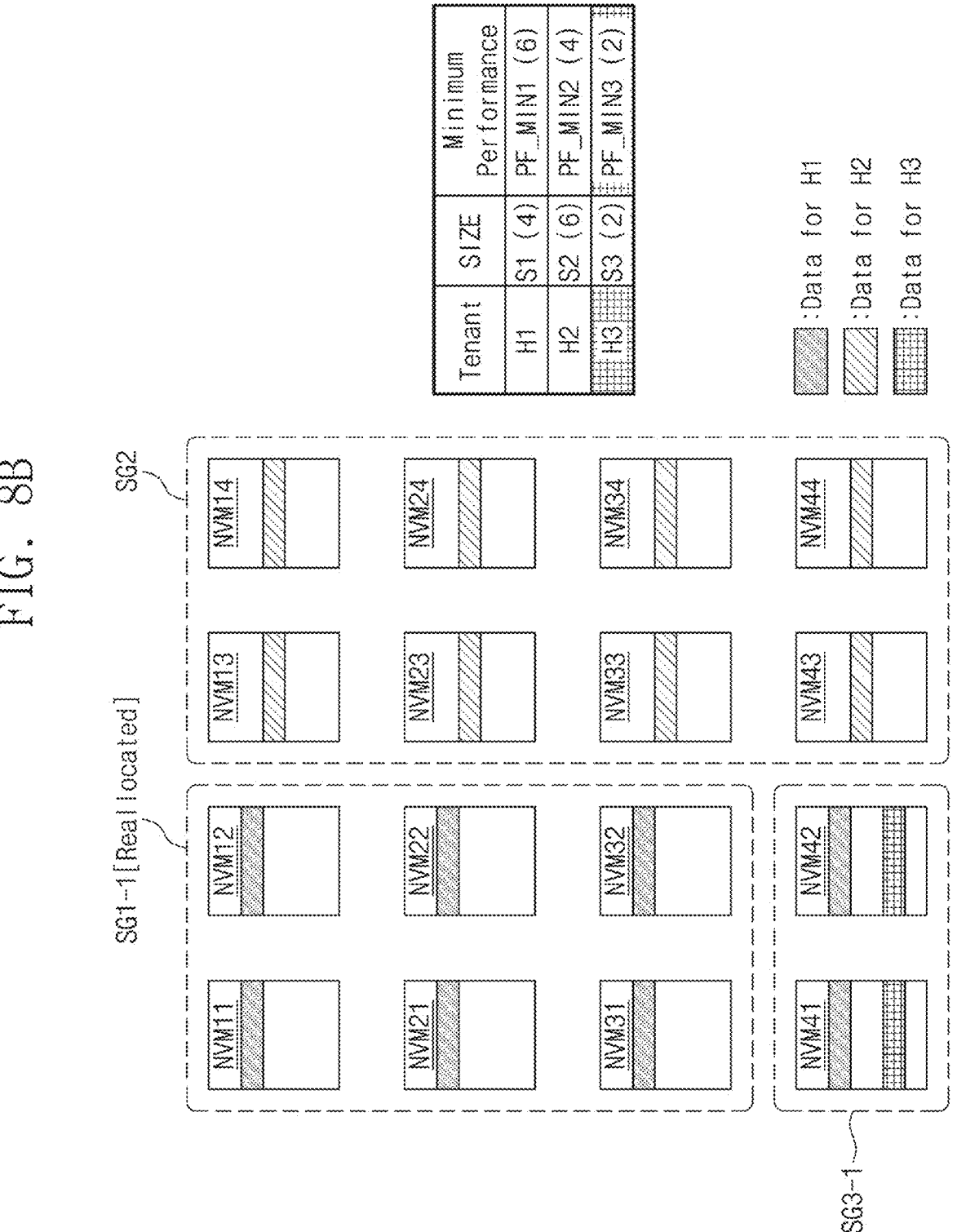

FIGS. 8A to 8C are diagrams for describing an operation of a storage device according to the flowchart of FIG. 5. Below, to describe some example embodiments of the present disclosure easily, it is assumed that a resource of the storage device 100 is the nonvolatile memory device NVM. Also, it is assumed that each nonvolatile memory device NVM has the size of "1" and the performance of "1". That is, "n" nonvolatile memory devices may have the maximum size (or storage space) of "n" and may support the maximum performance of "n".

First, referring to FIGS. 1, 2, 3, 8A, 8B, and 8C, the storage device 100 may include the plurality of nonvolatile memory devices NVM11 to NVM44. In this case, the storage device 100 may receive the first and second performance requirements from the first and second hosts H1 and H2, respectively. The first performance requirement of the first host H1 may include the information about the first size S1 and the first minimum performance PF_MIN1. In this case, the first size S1 may be "4", and the first minimum performance PF_MIN1 may be "6". The second performance requirement of the second host H2 may include the information about the second size S2 and the second minimum performance PF_MIN2. In this case, the second size S2 may be "6", and the second minimum performance PF_MIN2 may be "4".

The storage device 100 may allocate the nonvolatile memory devices NVM11 to NVM44 to the first and second hosts H1 and H2, based on the first and second performance requirements respectively received from the first and second hosts H1 and H2. For example, based on the first and second performance requirements respectively received from the first and second hosts H1 and H2, the resource manager 111 of the storage controller 110 may allocate the first striping group SG1 to the first host H1 and may allocate the second striping group SG2 to the second host H2. The first striping group SG1 may include the nonvolatile memory devices NVM11, NVM12, NVM21, NVM22, NVM31, NVM32, NVM41, and NVM42, and the second striping group SG2 may include the nonvolatile memory devices NVM13, NVM14, NVM23, NVM24, NVM33, NVM34, NVM43, and NVM44.

As described above, the first performance requirement of the first host H1 includes the first size S1 and the first minimum performance PF_MIN1, the first size S1 is "4", and the first minimum performance PF_MIN1 is "6". In this case, as the first striping group SG1 including eight nonvolatile memory devices is allocated to the first host H1, the first performance requirement of the first host H1 may be satisfied. Also, the second performance requirement of the second host H2 includes the second size S2 and the second minimum performance PF_MIN2, the second size S2 is "6", and the second minimum performance PF_MIN2 is "4". In this case, as the second striping group SG2 including eight nonvolatile memory devices is allocated to the second host H2, the second performance requirement of the second host H2 may be satisfied.

For example, in association with the write request of the first host H1, a super block may be formed based on the nonvolatile memory devices NVM11, NVM12, NVM21, NVM22, NVM31, NVM32, NVM41, and NVM42 of the first striping group SG1, and the write request of the first host H1 may be processed by using the super block. Alternatively, in association with the write request of the second host H2, a super block may be formed based on the nonvolatile memory devices NVM13, NVM14, NVM23, NVM24, NVM33, NVM34, NVM43, and NVM44 of the second striping group SG2, and the write request of the second host H2 may be processed by using the super block. In this case, the first and second performance requirements of the first and second hosts H1 and H2 may be satisfied.

In some example embodiments, while the storage device 100 allocates the resources to the first and second hosts H1 and H2 and operates under control of the first and second hosts H1 and H2, the third host H3 may be added to the storage system 10. In this case, the storage device 100 may receive a third performance requirement from the third host H3 and may reallocate or reconfigure resources (or striping groups) for the first to third hosts H1 to H3.

As an example, as illustrated in FIG. 8B or 8C, the storage device 100 may receive the third performance requirement from the third host H3. The third performance requirement includes the third size S3 and the third minimum performance PF_MIN3, the third size S3 is "2", and the third minimum performance PF_MIN3 is "2". In this case, the storage controller 110 may reallocate or reconfigure striping groups such that the performance requirements of the first to third hosts H1 to H3 are satisfied.

In detail, as illustrated in FIG. 8B, the resource manager 111 of the storage controller 110 may allocate a (3-1)-th striping group SG3-1 to the third host H3. The (3-1)-th striping group SG3-1 may include the nonvolatile memory devices NVM41 and NVM42. Because the (3-1)-th striping group SG3-1 allocated to the third host H3 includes two nonvolatile memory devices NVM41 and NVM42, the third performance requirement of the third host H3 may be satisfied. For example, in association with the write request of the third host H3, a super block may be formed based on the nonvolatile memory devices NVM41 and NVM42 included in the (3-1)-th striping group SG3-1, and the write request of the third host H3 may be processed by using the super block.

In this case, the resource manager 111 of the storage controller 110 may reallocate or reconfigure the first striping group SG1 allocated to the first host H1 to a (1-1)-th striping group SG1-1. The (1-1)-th striping group SG1-1 may include the nonvolatile memory devices NVM11, NVM12, NVM21, NVM22, NVM31, and NVM32. Because the (1-1)-th striping group SG1-1 reallocated or reconfigured to the first host H1 includes six nonvolatile memory devices, the first performance requirement of the first host H1 may be still satisfied.

That is, as illustrated in FIG. 8B, when the third performance requirement of the third host H3 is received, in consideration of the previous performance requirements of the first and second hosts H1 and H2 being previous hosts and the current performance requirement of the third host H3 being a current host, the storage device 100 may reallocate or reconfigure striping groups such that the performance requirements of all the hosts H1, H2, and H3 are satisfied. In this case, the striping groups SG1-1, SG2, and SG3-1 allocated to the first to third hosts H1, H2, and H3 are isolated from each other, the performance interference between the first to third hosts H1, H2, and H3 may be prevented or reduced in likelihood.

In some example embodiments, the data of the first host H1 stored in the (3-1)-th striping group SG3-1 may migrate into nonvolatile memory devices of the (1-1)-th striping group SG1-1 during an idle time of the storage device 100 or through a separate operation. Alternatively, the data of the first host H1 stored in the (3-1)-th striping group SG3-1 may be maintained in the (3-1)-th striping group SG3-1 unless an explicit request is received. For example, in at least one example embodiment, the data of the first host H1 stored in the (3-1)-th striping group SG3-1 may migrate into nonvolatile memory devices of the (1-1)-th striping group SG1-1 if an explicit request is received.

In some example embodiments, as illustrated in FIG. 8C, the storage device 100 may allocate a (3-2)-th striping group SG3-2 without reallocating or reconfiguring the existing striping groups SG1 and SG2. In this case, the (3-2)-th striping group SG3-2 may include the nonvolatile memory devices NVM31, NVM32, NVM41, and NVM42. That is, the (3-2)-th striping group SG3-2 may at least partially overlap the first striping group SG1. In other words, the first and third hosts H1 and H3 may share some resources (e.g., the nonvolatile memory devices NVM31, NVM32, NVM41, and NVM42).

In this case, the storage device 100 may guarantee or provide the minimum performance of the first and third hosts H1 and H3 through a traffic control of some resources shared by the first and third hosts H1 and H3. For example, when the traffic control for the (3-2)-th striping group SG3-2 is performed, the ratio at which the third host H3 occupies the (3-2)-th striping group SG3-2 may be guaranteed or provided as much as 50%. That is, the performance requirements of all the hosts may be satisfied through the traffic control of resources shared by some hosts.

In some example embodiments, the traffic control of a nonvolatile memory device may be implemented through various schemes. For example, the storage controller 110 may restrict the number of times or the frequency that the first and third hosts H1 and H3 access the nonvolatile memory devices NVM31, NVM32, NVM41, and NVM42, based on a scheme such as a token scheme, a throughput restriction scheme, or an I/O restriction scheme.

FIG. 9 is a diagram for describing performance requirements received from a plurality of hosts of FIG. 1. For convenience of description, performance requirements of the first to third hosts H1 to H3 will be described. However, the present disclosure is not limited thereto.

As illustrated in FIG. 9, the first to third hosts H1 to H3 may have different performance requirements. For example, the first performance requirement of the first host H1 may include information about the first size S1 and the first minimum performance PF_MIN1. The second performance requirement of the second host H2 may include the information about the second size S2 and the second minimum performance PF_MIN2. The third performance requirement of the third host H3 may include information about the third size S3 and the third minimum performance PF_MIN3. The information about the sizes S1, S2, and S3 and the minimum performance PF_MIN1, PF_MIN2, and PF_MIN3 of the first to third hosts H1, H2, and H3 is described with reference to FIG. 7, and thus, additional description will be omitted to avoid redundancy.

In some example embodiments, the performance requirements of the first to third hosts H1 to H3 may further include information about an isolation level. For example, the first performance requirement of the first host H1 may further include information about a first isolation level LV_ISO1, the second performance requirement of the second host H2 may further include information about a second isolation level LV_ISO2, and the third performance requirement of the third host H3 may further include information about a third isolation level LV_ISO3.

The isolation level may refer to information indicating whether a resource allocated to a relevant host should be isolated from a resource allocated to any other host. For example, the first host H1 may not want to share a resource with the remaining hosts. Alternatively, the first host H1 may want to avoid performance interference by the remaining hosts. In this case, the first isolation level LV_ISO1 of the first host H1 may be set to a high level (H); in response to the first isolation level LV_ISO1 of the high level, the storage device 100 may allocate or configure the first striping group SG1 such that resources allocated to the first host H1 do not overlap resources allocated to the remaining hosts or such that resources allocated to the first host H1 are not shared by the remaining hosts.

Alternatively, in the case where the second host H2 sharing a resource with any other host is allowable, the second isolation level LV_ISO2 of the second host H2 may be set to a low level (L). In response to the second isolation level LV_ISO2 of the low level, the storage device 100 may allocate the second striping group SG2 regardless of whether resources allocated to the second host H2 overlap resources allocated to any other hosts or whether resources allocated to the second host H2 are shared by any other hosts.

Figure 10A:
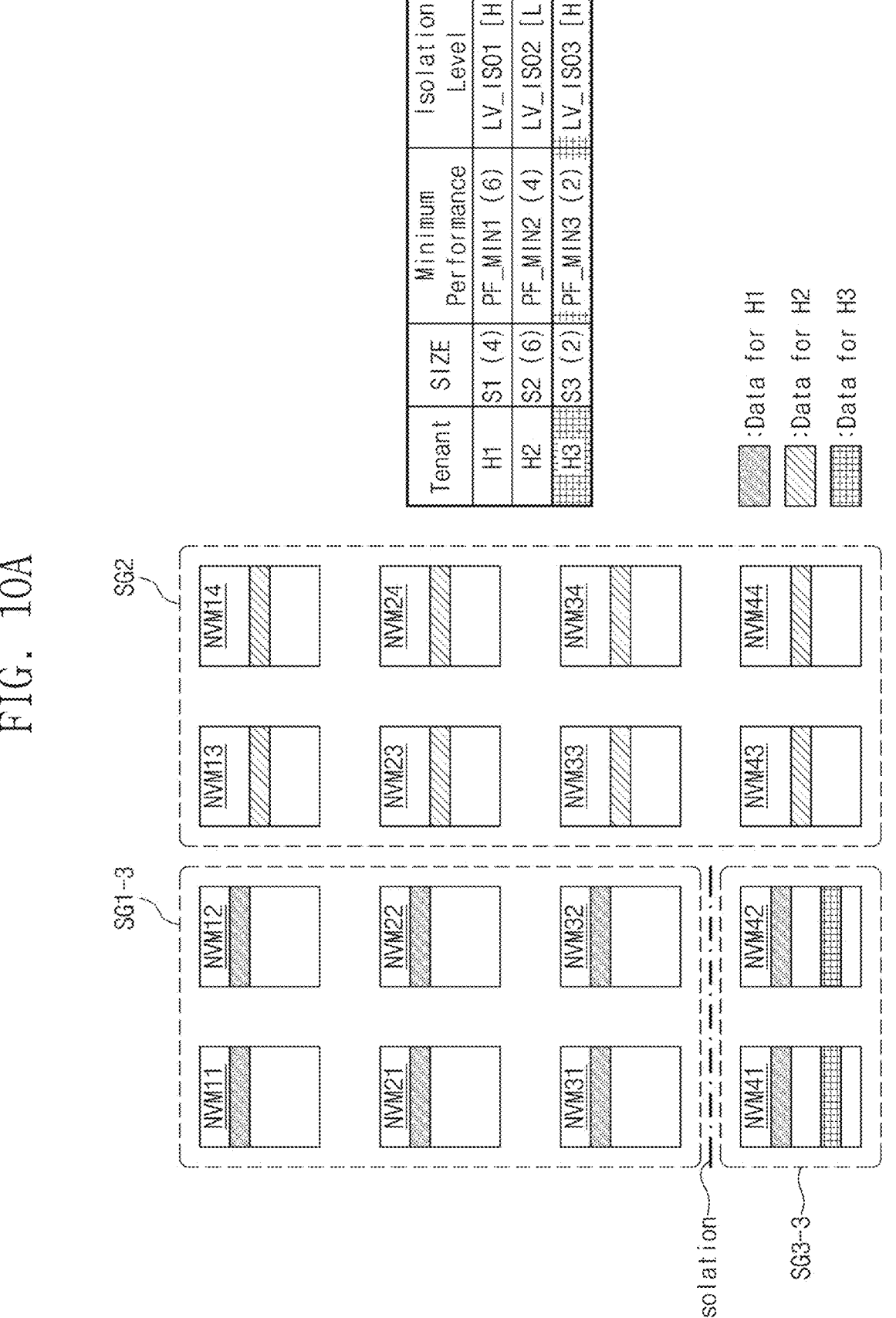
FIGS. 10A and 10B are diagrams for describing a method of allocating resources of a storage device based on the performance requirements of FIG. 9.
Figure 10B:
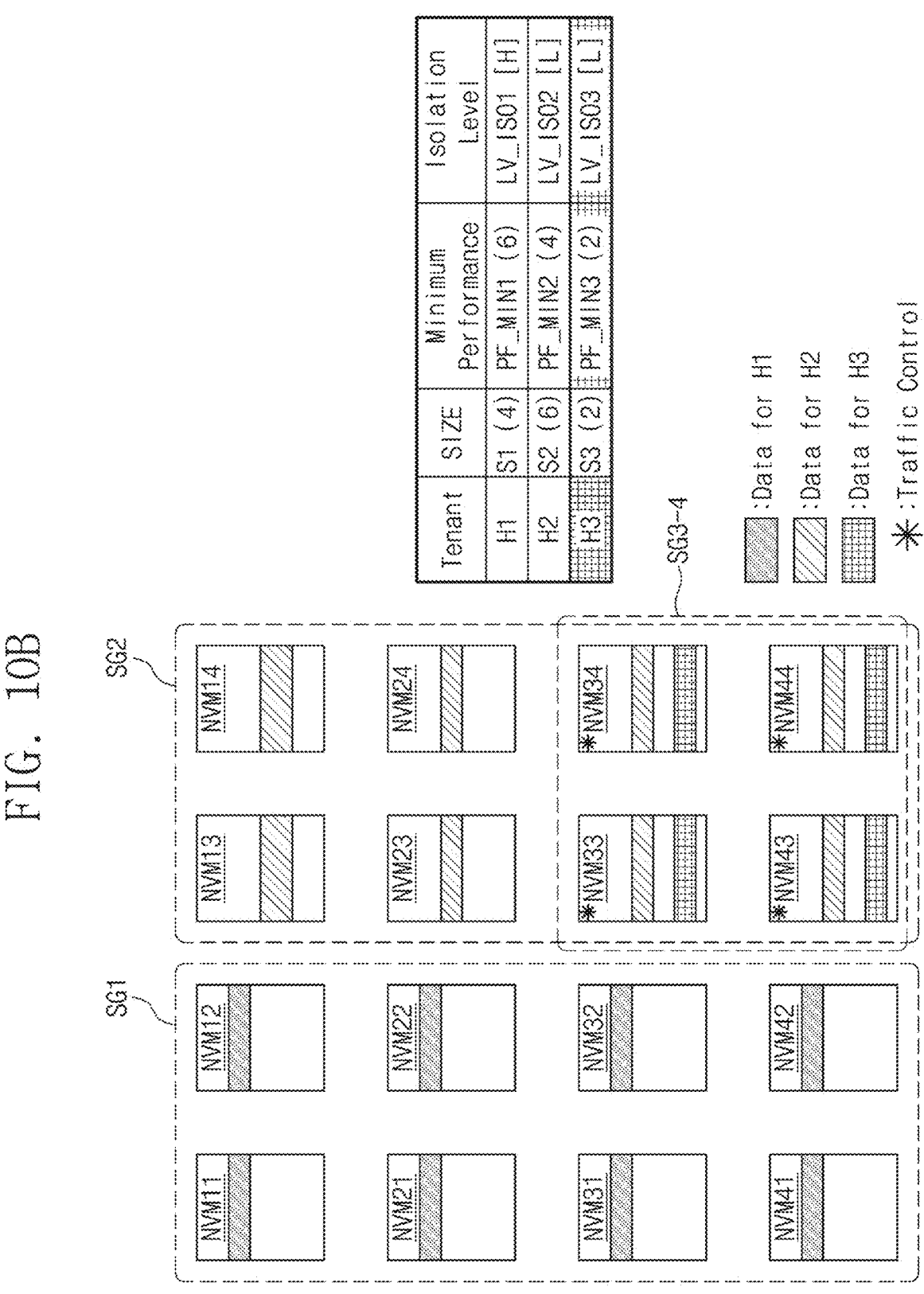

FIGS. 10A and 10B are diagrams for describing a method of allocating resources of a storage device based on the performance requirements of FIG. 9. For convenience of description, it is assumed that the storage device 100 is in a state where the first and second striping groups SG1 and SG2 are allocated to the first and second hosts H1 and H2. In this case, as described with reference to FIG. 8A, the first striping group SG1 may include the nonvolatile memory devices NVM11, NVM12, NVM21, NVM22, NVM31, NVM32, NVM41, and NVM42, and the second striping group SG2 may include the nonvolatile memory devices NVM13, NVM14, NVM23, NVM24, NVM33, NVM34, NVM43, and NVM44.

In some example embodiments, the storage device 100 may receive the third performance requirement from the third host H3 and may reallocate or reconfigure resources of the storage device 100 such that the third performance requirement of the third host H3 is satisfied. For example, as illustrated in FIG. 10A, the storage device 100 may receive the third performance requirement from the third host H3. The third performance requirement may include the third size S3, the third minimum performance PF_MIN3, and the third isolation level LV_ISO3, the third size S3 is "2", the third minimum performance PF_MIN3 is "2", and the third isolation level LV_ISO3 may be the high level (H).

In this case, the storage device 100 may reallocate or reconfigure a (3-3)-th striping group SG3-3 such that resources allocated to the third host H3 do not overlap the resources allocated to the remaining hosts H1 and H2 or such that resources allocated to the third host H3 are not shared by the remaining hosts H1 and H2. For example, the resource manager 111 of the storage controller 110 may allocate the nonvolatile memory devices NVM41 and NVM42 to the (3-3)-th striping group SG3-3. The (3-3)-th striping group SG3-3 may be accessed by the third host H3. In this case, because the first and third isolation levels ISO_LV1 and ISO_LV3 of the first and third hosts H1 and H3 are the high level, the resource manager 111 of the storage controller 110 may reconfigure the first striping group SG1 to a (1-3)-th striping group SG1-3. In this case, the (1-3)-th striping group SG1-3 may include the nonvolatile memory devices NVM11, NVM12, NVM21, NVM22, NVM31, and NVM32.

That is, as described above, when an isolation level of a performance requirement of a specific host is the high level, the storage device 100 may configure a striping group corresponding to the specific host so as not to overlap resources allocated to the remaining hosts or so as not to be shared by the remaining hosts. Accordingly, the performance interference in each host may be prevented or reduced in likelihood.

Alternatively, as illustrated in FIG. 10B, the storage device 100 may receive the third performance requirement from the third host H3. The third performance requirement may include the third size S3, the third minimum performance PF_MIN3, and the third isolation level LV_ISO3, the third size S3 is "2", the third minimum performance PF_MIN3 is "2", and the third isolation level LV_ISO3 may be the low level (L).

In this case, the storage device 100 may allocate a (3-4)-th striping group SG3-4 regardless of whether resources allocated to the third host H3 overlap the resources allocated to the remaining hosts H1 and H2 or whether resources allocated to the third host H3 are shared by the remaining hosts H1 and H2. For example, the resource manager 111 of the storage controller 110 may allocate the (3-4)-th striping group SG3-4 including the nonvolatile memory devices NVM33, NVM34, NVM43, and NVM44 to the third host H3. In this case, the nonvolatile memory devices NVM33, NVM34, NVM43, and NVM44 may be included in the second striping group SG2 allocated to the second host H2.

Because the second isolation level LV_ISO2 of the second host H2 and the third isolation level LV_ISO3 of the third host H3 are the low level, the resource manager 111 of the storage controller 110 may not perform additional reconfiguration for the second striping group SG2.

In some example embodiments, because the second striping group SG2 allocated to the second host H2 and the (3-4)-th striping group SG3-4 allocated to the third host H3 share some resources (e.g., the nonvolatile memory devices NVM33, NVM34, NVM43, and NVM44), the storage controller 110 may perform the traffic control of the some resources (e.g., the nonvolatile memory devices NVM33, NVM34, NVM43, and NVM44). The traffic control is described above, and thus, additional description will be omitted to avoid redundancy.

In some example embodiments, because the first isolation level LV_ISO1 of the first host H1 may be the high level, even though the third isolation level LV_ISO3 of the third host H3 is the low level, the (3-4)-th striping group SG3-4 allocated to the third host H3 may not share resources with the first striping group SG1 allocated to the first host H1.

Figure 11:
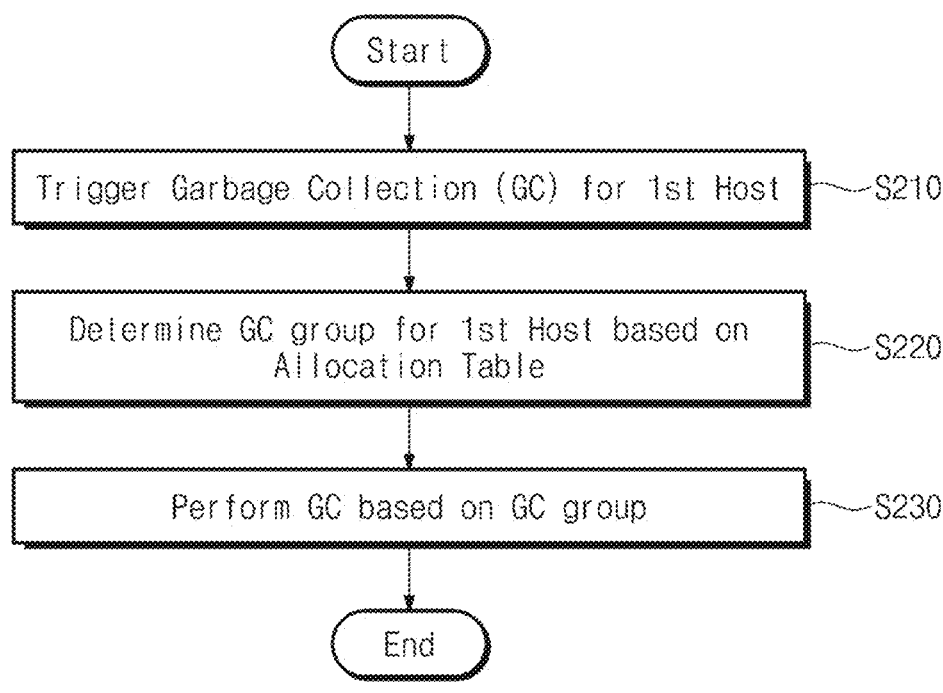
FIG. 11 is a flowchart illustrating an operation of a storage device of FIG. 1.

FIG. 11 is a flowchart illustrating an operation of a storage device of FIG. 1. The garbage collection operation on resources allocated to the first host H1 will be described with reference to FIG. 11. However, the present disclosure is not limited thereto.

Referring to FIGS. 1, 2, 6, and 11, in operation S210, the storage device 100 may trigger garbage collection for the first host H1. For example, when a physical storage space for the first host H1 is insufficient, the storage device 100 may secure the physical swap space for the first host H1 by performing garbage collection for resources allocated to the first host H1.

In operation S220, the storage device 100 may determine a garbage collection group for the first host H1, based on the allocation table 111b. For example, the storage device 100 may determine resources targeted for the garbage collection operation, based on information stored in the allocation table 111b. The resources targeted for the garbage collection operation may be designated as a garbage collection group.

In operation S230, the storage device 100 may perform the garbage collection operation, based on the determined garbage collection group.

In some example embodiments, as the storage device 100 dynamically reconfigures resource allocation for the plurality of hosts H1 to Hn, data associated with the first host H1 may be stored in a resource(s) allocated to any other host. In this case, even though the data associated with the first host H1 are stored in a resource(s) allocated to any other host, the storage device 100 may not select the resource(s) allocated to any other host as a target of the garbage collection operation.

In the garbage collection operation for the first host H1, because resources allocated to any other host are not selected as a target of the garbage collection operation, performance interference in any other host due to the garbage collection operation for the first host H1 is prevented or reduced in likelihood.

Figure 12:
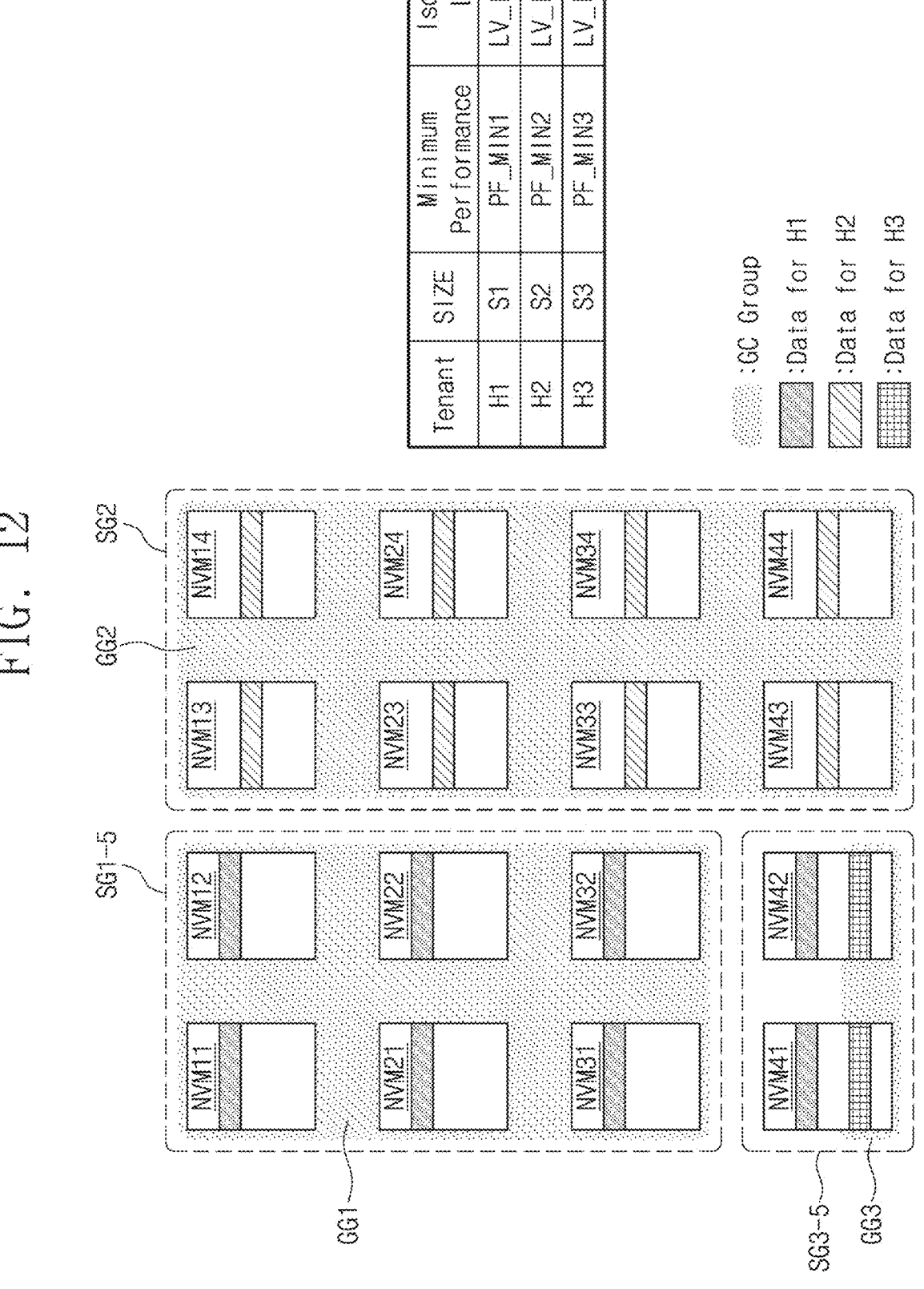
FIG. 12 is a diagram for describing an operation of a storage device according to the flowchart of FIG. 11.

FIG. 12 is a diagram for describing an operation of a storage device according to the flowchart of FIG. 11. For convenience of description, based on the first to third performance requirements of the first to third hosts H1 to H3, the storage device 100 may allocate a (1-5)-th striping group SG1-5 to the first host H1, may allocate the second striping group SG2 to the second host H2, and may allocate a (3-5)-th striping group SG3-5 to the third host H3. The (1-5)-th striping group SG1-5 may include the nonvolatile memory devices NVM11, NVM12, NVM21, NVM22, NVM31, and NVM32, the second striping group SG2 may include the nonvolatile memory devices NVM13, NVM14, NVM23, NVM24, NVM33, NVM34, NVM43, and NVM44, and the (3-5)-th striping group SG3-5 may include the nonvolatile memory devices NVM41 and NVM42.

Because the physical storage space of the (1-5)-th striping group SG1-5 allocated to the first host H1 may be insufficient, the storage device 100 may perform the garbage collection operation for the first host H1. In this case, the storage device 100 may select a first garbage collection group GG1 as a target of the garbage collection operation for the first host H1. The first garbage collection group GG1 may include the nonvolatile memory devices NVM11, NVM12, NVM21, NVM22, NVM31, and NVM32. The storage device 100 may form a super block based on the nonvolatile memory devices NVM11, NVM12, NVM21, NVM22, NVM31, and NVM32 included in the first garbage collection group GG1 and may perform the garbage collection operation for the first host H1 based on the super block thus formed.

In some example embodiments, due to the resource reallocation of the storage device 100, the nonvolatile memory devices NVM41 and NVM42 of the (3-5)-th striping group SG3-5 may be in a state of storing data associated with the first host H1 and the third host H3. In this case, in a conventional storage device, the nonvolatile memory devices NVM41 and NVM42 are selected as a target of the garbage collection operation for the first host H1. In contrast, even though the data associated with the first host H1 are stored in the nonvolatile memory devices NVM41 and NVM42, because the nonvolatile memory devices NVM41 and NVM42 are included in the (3-5)-th striping group SG3-5 allocated to any other host (e.g., H3), the storage device 100 according to some example embodiments of the present disclosure does not select the nonvolatile memory devices NVM41 and NVM42 as a target of the garbage collection operation for the first host H1. That is, the nonvolatile memory devices NVM41 and NVM42 may be excluded in the garbage collection operation for the first host H1. Accordingly, the performance interference due to the garbage collection operation for the first host H1 may not or may be less likely to occur in the third host H3.

In some example embodiments, the data of the first host H1 stored in the nonvolatile memory devices NVM41 and NVM42 may be invalidated by an operation (e.g., a data update or delete operation) of the first host H1. That is, the data of the first host H1 stored in the nonvolatile memory devices NVM41 and NVM42 may not migrate to any other nonvolatile memory device or any other memory block until the data of the first host H1 are invalidated by the first host H1 (e.g., may be excluded from a target for the garbage collection operation). When all the data associated with the first host H1 are invalidated by the operation of the first host H1, a relevant memory block(s) may be returned to a free block(s). The memory block(s) returned to the free block(s) may be used to store data associated with the third host H3.

As in the above description, the storage device 100 may select a second garbage collection group GG2 as a target of the garbage collection operation for the second host H2 and may select a third garbage collection group GG3 as a target of the garbage collection operation for the third host H3.

Figure 13:
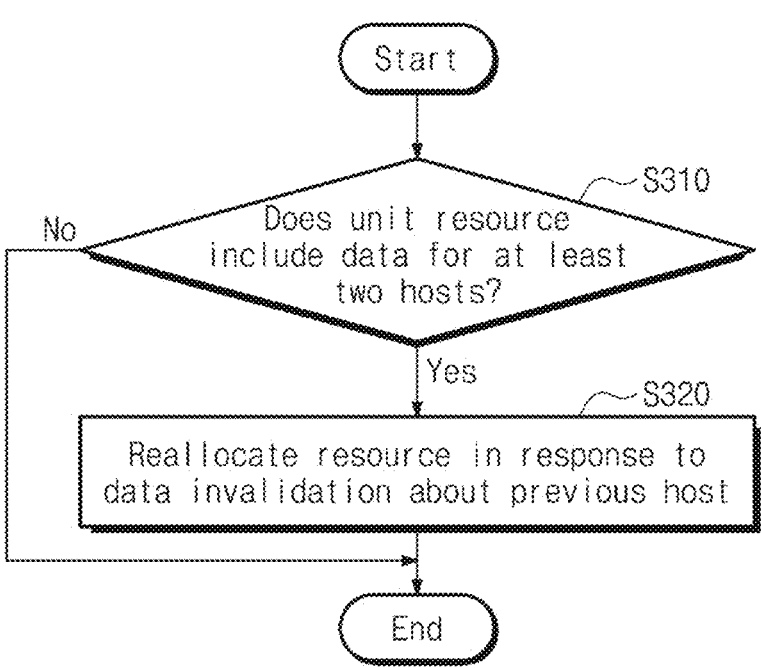
FIG. 13 is a flowchart illustrating an operation of a storage device of FIG. 1.

FIG. 13 is a flowchart illustrating an operation of a storage device of FIG. 1. Referring to FIGS. 1 and 13, in operation S310, the storage device 100 may determine whether one unit resource includes data associated with at least two hosts. For example, as described with reference to FIG. 8B, 8C, 10A, 10B, or 12, as the storage device 100 dynamically reconfigures physical resources, data corresponding to at least two hosts may be stored in a specific nonvolatile memory device. As an example, as illustrated in FIG. 8B, the nonvolatile memory devices NVM41 and NVM42 may store both data associated with the first host H1 and data associated with the third host H3. In this case, it may be determined that one unit resource includes data associated with at least two hosts.

When one unit resource includes data associated with at least two hosts, in operation S320, the storage device 100 may reallocate resources in response to data invalidation by a previous host. For example, as illustrated in FIG. 8B, the nonvolatile memory devices NVM41 and NVM42 may store both the data associated with the first host H1 and the data associated with the third host H3, and the nonvolatile memory devices NVM41 and NVM42 may be included in the (3-1)-th striping group SG3-1 allocated to the third host H3. That is, the nonvolatile memory devices NVM41 and NVM42 are configured to store the data associated with the third host H3. In this case, the first host H1 corresponding to the data stored in the nonvolatile memory devices NVM41 and NVM42 may be the previous host. When all the data of the first host H1 are invalidated in a specific nonvolatile memory device, the storage device 100 may reconfigure striping groups such that the specific nonvolatile memory device is included in the (3-5)-th striping group SG3-5 allocated to the third host H3.

As described above, according to some example embodiments of the present disclosure, the storage device 100 may dynamically reallocate or reconfigure resources to the plurality of hosts H1 to Hn, based on of the performance requirements of the plurality of hosts H1 to Hn. In this case, even though data associated with at least two hosts are together stored in a specific resource (e.g., a specific nonvolatile memory device), the storage device 100 may not perform the garbage collection operation for the previous host in association with the specific nonvolatile memory device and may reallocate or reconfigure nonvolatile memory devices in response to data invalidation by the previous host.

Figure 14A:
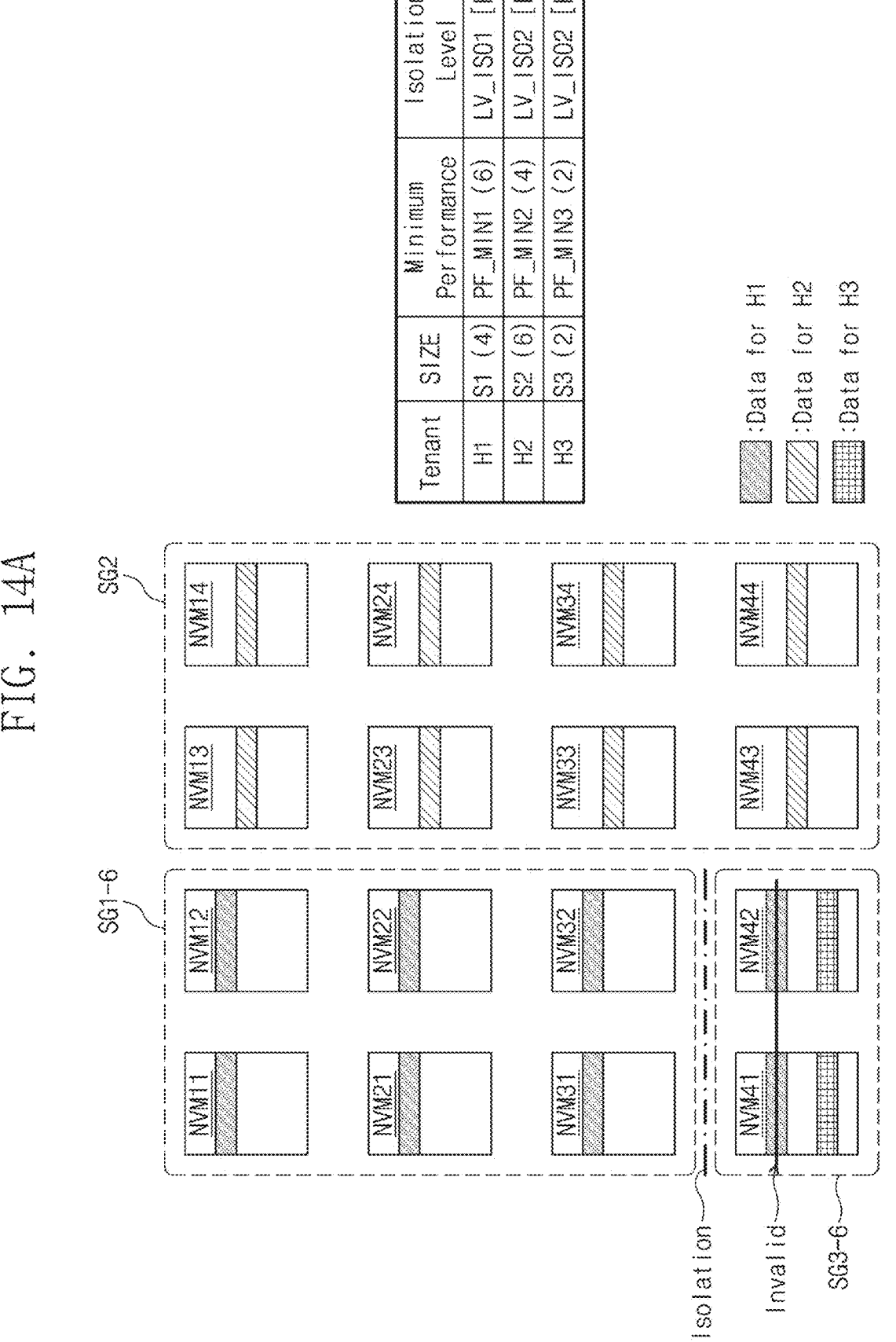
FIGS. 14A and 14B are diagrams for describing an operation of a storage device according to the flowchart of FIG. 13.
Figure 14B:
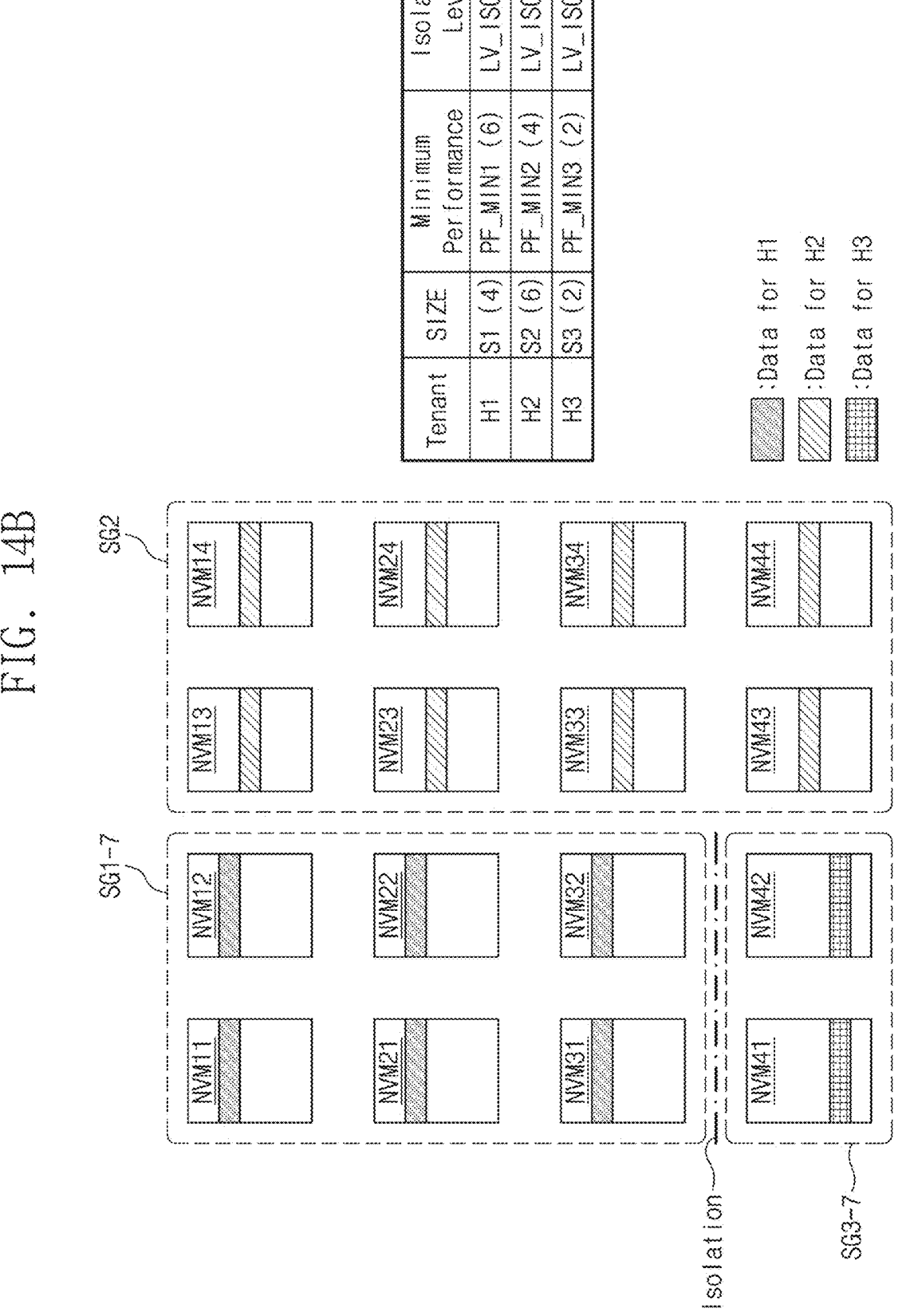

FIGS. 14A and 14B are diagrams for describing an operation of a storage device according to the flowchart of FIG. 13. Referring to FIGS. 14A and 14B, based on the performance requirements of the first to third hosts H1 to H3, the storage device 100 may allocate a (1-6)-th striping group SG1-6 to the first host H1, may allocate the second striping group SG2 to the second host H2, and may allocate a (3-6)-th striping group SG3-6 to the third host H3.

The (1-6)-th striping group SG1-6 may include the nonvolatile memory devices NVM11, NVM12, NVM21, NVM22, NVM31, and NVM32, the second striping group SG2 may include the nonvolatile memory devices NVM13, NVM14, NVM23, NVM24, NVM33, NVM34, NVM43, and NVM44, and the (3-6)-th striping group SG3-6 may include the nonvolatile memory devices NVM41 and NVM42. Due to the resource reallocation of the storage device 100, the nonvolatile memory devices NVM41 and NVM42 of the (3-6)-th striping group SG3-6 may include both data associated with the first host H1 and data associated with the third host H3.

In this case, all the data of the first host H1 stored in the nonvolatile memory devices NVM41 and NVM42 of the (3-6)-th striping group SG3-6 may be invalidated due to the operation between the first host H1 and the storage device 100. For example, as described above, to prevent or reduce in likelihood the performance interference in the third host H3 due to the garbage collection operation for the first host H1, the storage device 100 may not perform the garbage collection operation for the first host H1 in association with the nonvolatile memory devices NVM41 and NVM42. In this case, the data of the first host H1 stored in the nonvolatile memory devices NVM41 and NVM42 may be maintained. Afterwards, the data of the first host H1 stored in the nonvolatile memory devices NVM41 and NVM42 may be updated or deleted by the operation of the first host H1; in this case, the data of the first host H1 stored in the nonvolatile memory devices NVM41 and NVM42 may be invalidated.

In this case, as illustrated in FIG. 14B, in the nonvolatile memory devices NVM41 and NVM42, memory blocks in which the data (or invalidated data) of the first host H1 are stored are returned to free blocks. That is, the nonvolatile memory devices NVM41 and NVM42 may be reconfigured to a (3-7)-th striping group SG3-7 allocated to the third host H3; in this case, the nonvolatile memory devices NVM41 and NVM42 may only store data associated with the third host H3.

Figure 15A:
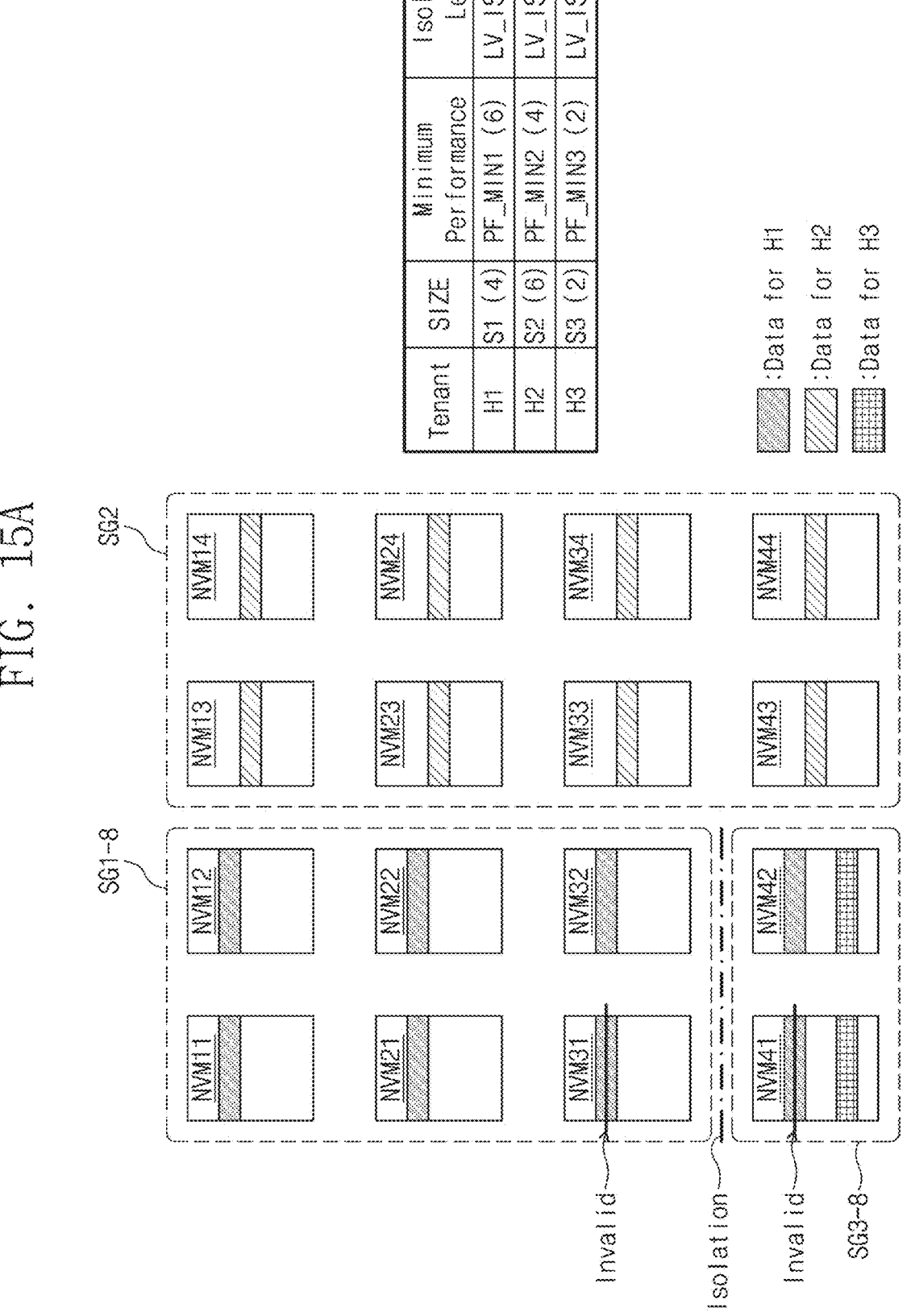
FIGS. 15A and 15B are diagrams for describing an operation of a storage device according to the flowchart of FIG. 13.
Figure 15B:
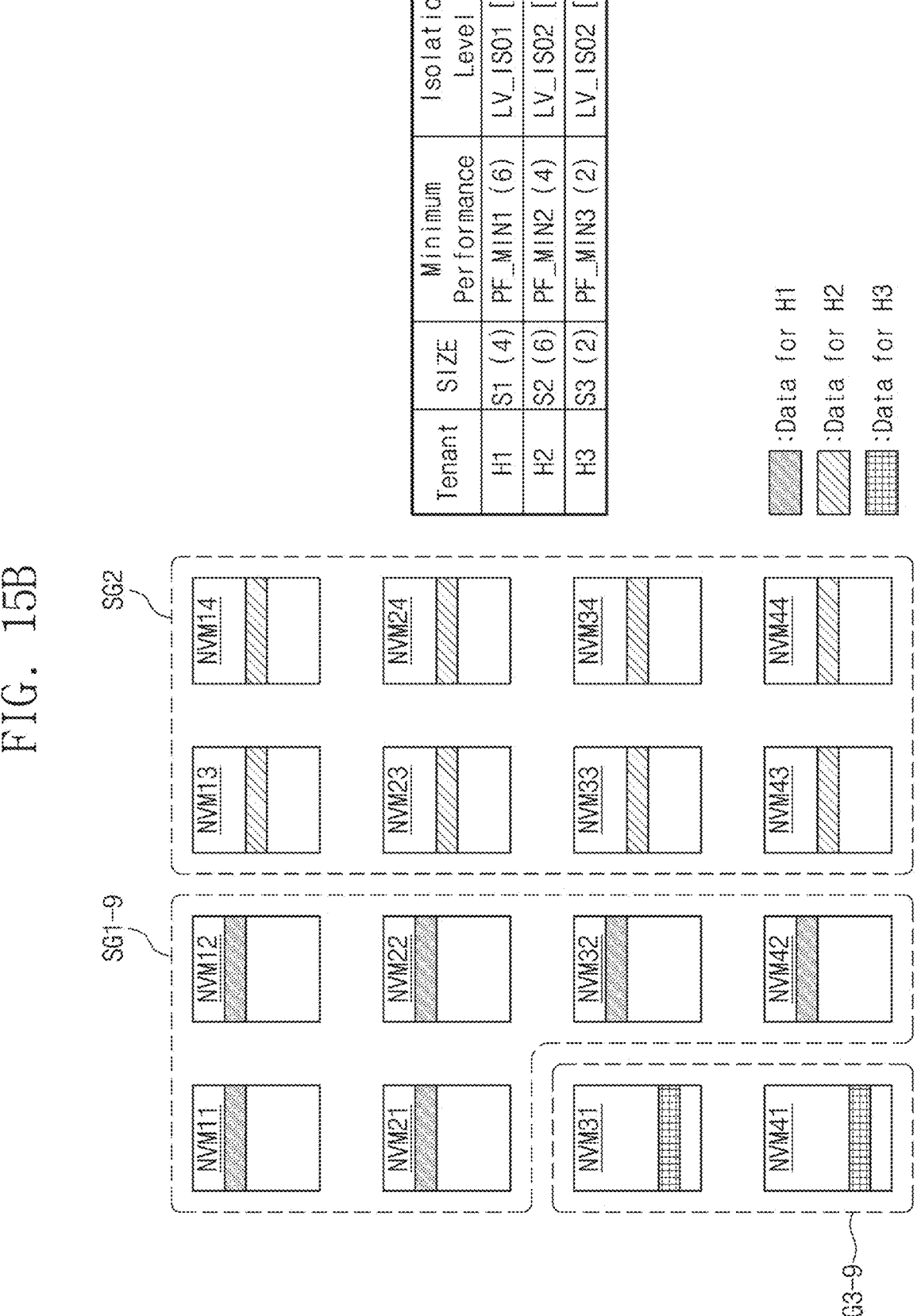

FIGS. 15A and 15B are diagrams for describing an operation of a storage device according to the flowchart of FIG. 13. Referring to FIGS. 15A and 15B, based on the performance requirements of the first to third hosts H1 to H3, the storage device 100 may allocate a (1-8)-th striping group SG1-8 to the first host H1, may allocate the second striping group SG2 to the second host H2, and may allocate a (3-8)-th striping group SG3-8 to the third host H3.

The (1-8)-th striping group SG1-8, the second striping group SG2, and the (3-8)-th striping group SG3-8 are similar to the (1-6)-th striping group SG1-6, the second striping group SG2, and the (3-6)-th striping group SG3-6 described with reference to FIG. 14A, and thus, additional description will be omitted to avoid redundancy.

In some example embodiments, by the operation of the first host H1 and the storage device 100, all the data of the first host H1 stored in the nonvolatile memory device NVM31 included in the (1-8)-th striping group SG1-8 and the nonvolatile memory device NVM41 included in the (3-8)-th striping group SG3-8 may be invalidated. For example, as described with reference to FIG. 14A, the data of the first host H1 stored in the nonvolatile memory device NVM41 may be updated or deleted by the operation of the first host H1; in this case, the data of the first host H1 stored in the nonvolatile memory device NVM41 may be invalidated. Alternatively, as described above, the storage device 100 may select the nonvolatile memory device NVM31 as a target of the garbage collection operation for the first host H1. Accordingly, all the data of the first host H1 stored in the nonvolatile memory device NVM31 may be invalidated or may migrate to any other nonvolatile memory device. In this case, all the memory blocks included in the nonvolatile memory device NVM31 may be free blocks.

That is, all the data of the first host H1 stored in the nonvolatile memory device NVM31 of the (1-8)-th striping group SG1-8 allocated to the first host H1 and the nonvolatile memory device NVM41 allocated to the third host H3 may be invalidated by the operation of the first host H1 and the storage device 100. In this case, as illustrated in FIG. 15B, the storage device 100 may reallocate or reconfigure striping groups allocated to the first and third hosts H1 and H3 to a (1-9)-th striping group SG1-9 and a (3-9)-th striping group SG3-9. The (1-9)-th striping group SG1-9 may include the nonvolatile memory devices NVM11, NVM12, NVM21, NVM22, NVM32, and NVM42, and the (3-9)-th striping group SG3-9 may include the nonvolatile memory devices NVM31 and NVM41.

As described above, according to some example embodiments of the present disclosure, the storage device 100 may dynamically allocate physical resources based on the performance requirements of the plurality of hosts H1 to Hn. In this case, the performance interference between the plurality of hosts H1 to Hn may be prevented or reduced in likelihood, and the performance requirement (e.g., the minimum performance) may be satisfied. Accordingly, the storage device 100 with improved performance and an operation method thereof are provided.

To describe some example embodiments of the present disclosure easily, example embodiments in which the third host H3 is added to the storage system 10 are described, but the present disclosure is not limited thereto. For example, while the storage system 10 operates, the performance requirement of each of the plurality of hosts H1 to Hn may be changed, the changed performance requirement may be provided to the storage device 100, and the storage device 100 may reconfigure resources such that the changed performance requirement is satisfied.

Figure 16:
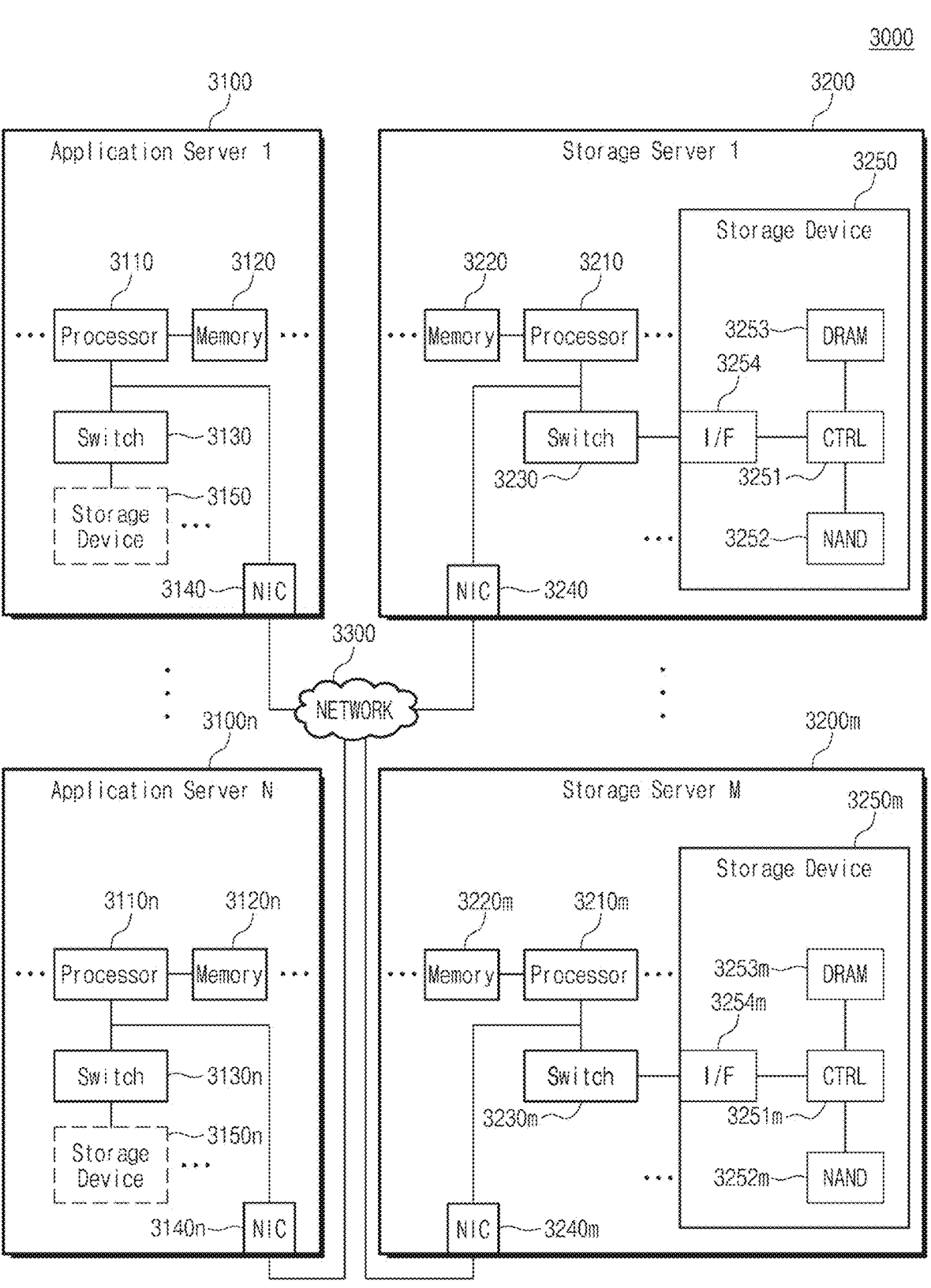
FIG. 16 is a block diagram illustrating a data center to which a storage device according to some example embodiments of the present disclosure may be applied.

FIG. 16 is a diagram of a data center 3000 to which a memory device is applied, according to some example embodiments.

Referring to FIG. 16, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to some example embodiments. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some example embodiments, the numbers of processors 3210 and memories 3220 included in the storage server 3200 may be variously selected. In some example embodiments, the processor 3210 and the memory 3220 may provide a processor-memory pair. In some example embodiments, the number of processors 3210 may be different from the number of memories 3220. The processor 3210 may include a single-core processor or a multi-core processor. The above description of the storage server 3200 may be similarly applied to the application server 3100. In some example embodiments, the application server 3100 may not include a storage device 3150. The storage server 3200 may include at least one storage device 3250. The number of storage devices 3250 included in the storage server 3200 may be variously selected according to some example embodiments.

The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In some example embodiments, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another example embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300. Also, the application server 3100 may obtain data, which is requested by the user or the client to be read, from one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. Alternatively, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC (Network InterConnect) 3240. The switch 3230 may selectively connect the processor 3210 to the storage device 3250 or selectively connect the NIC 3240 to the storage device 3250 via the control of the processor 3210.

In some example embodiments, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

In the storage servers 3200 to 3200m or the application servers 3100 to 3100n, a processor may transmit a command to storage devices 3150 to 3150n and 3250 to 3250m or the memories 3120 to 3120n and 3220 to 3220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150n and 3250 to 3250m may transmit a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In an example embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

In some example embodiments, the application servers 3100 to 3100n, the storage servers 3200 to 3200m, or the storage devices 3150 to 3150n and 3250 to 3250m respectively included in the application servers 3100 to 3100n and the storage servers 3200 to 3200m may be the storage device 100 described with reference to FIGS. 1 to 15B. For example, the application servers 3100 to 3100n, the storage servers 3200 to 3200m, or the storage devices 3150 to 3150n and 3250 to 3250m respectively included in the application servers 3100 to 3100n and the storage servers 3200 to 3200m may allocate resources to a plurality of hosts or a plurality of tenants, based on the operation method described with reference to FIGS. 1 to 15B.

According to the present disclosure, as a storage device dynamically reallocates or reconfigures physical resources to a plurality of hosts, based on performance requirements of the plurality of hosts, the performance requirements of the plurality of hosts may be satisfied. Accordingly, a storage device with improved performance and an operation method thereof are provided.

Any or all of the elements described with reference to the figures may communicate with any or all other elements described with reference to the respective figures. For example, any element may engage in one-way and/or two-way and/or broadcast communication with any or all other elements, to transfer and/or exchange and/or receive information such as but not limited to data and/or commands, in a manner such as in a serial and/or parallel manner, via a bus such as a wireless and/or a wired bus (not illustrated). The information may be in encoded various formats, such as in an analog format and/or in a digital format.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While the present disclosure has been described with reference to some example embodiments thereof, and example embodiments are not necessarily mutually exclusive with one another, it will be apparent to those of ordinary skill in the art that various changes and modifications may be made thereto without departing from the spirit and scope of the present disclosure as set forth in the following claims.

What is claimed is:

1. An operation method of a storage device which includes a plurality of nonvolatile memory devices, the method comprising:

receiving a first performance requirement from a first host;

allocating a 0-th striping group of the plurality of nonvolatile memory devices to the first host, based on the first performance requirement;

writing first data of the first host in the 0-th striping group, in response to a first write request of the first host;

receiving a second performance requirement from a second host;

reallocating the plurality of nonvolatile memory devices such that a first striping group of the plurality of nonvolatile memory devices is allocated to the first host and a second striping group of the plurality of nonvolatile memory devices is allocated to the second host, based on the first performance requirement and the second performance requirement; and performing a garbage collection operation for the first host,

wherein the second striping group includes at least some of nonvolatile memory devices included in the 0-th striping group, and wherein a first part of the nonvolatile memory devices included in the second striping group stores the first data of the first host and the first part storing the first data is not selected as a target of the garbage collection operation for the first host.

2. The method of claim 1, wherein the first performance requirement includes information about a first storage capacity and first minimum performance required by the first host, and wherein the second performance requirement includes information about a second storage capacity and second minimum performance required by the second host.

3. The method of claim 2, wherein the 0-th striping group and the first striping group satisfy the first storage capacity and the first minimum performance, and wherein the second striping group satisfies the second storage capacity and the second minimum performance.

4. The method of claim 1, wherein the writing of the first data of the first host in the 0-th striping group in response to the first write request of the first host includes:

generating a first super block based on nonvolatile memory devices included in the 0-th striping group; and writing the first data in the first super block, and wherein the first super block includes a memory block included in each of the nonvolatile memory devices included in the 0-th striping group.

5. The method of claim 1, wherein the performing of the garbage collection operation for the first host is triggered in response to a physical storage space of the first striping group being insufficient.

6. The method of claim 1, wherein the first data stored in the first part of the nonvolatile memory devices included in the second striping group are invalidated by an operation of the first host, and in response to the first data being invalidated, memory blocks where the first data are stored are returned to free blocks.

7. The method of claim 1, further comprising:

in response to data of the first host being invalidated in at least one nonvolatile memory device among nonvolatile memory devices included in the first striping group, reallocating a third striping group to the first host and reallocating a fourth striping group to the second host, wherein the at least one nonvolatile memory device is included in the fourth striping group.

8. The method of claim 1, further comprising:

receiving a third performance requirement from a third host; and allocating a third striping group of the plurality of nonvolatile memory devices to the third host, based on the third performance requirement.

9. The method of claim 8, wherein the third striping group shares at least one of the nonvolatile memory devices included in the first striping group.

10. The method of claim 9, further comprising:

performing a traffic control of the nonvolatile memory devices shared by the first striping group and the third striping group.

11. The method of claim 1, wherein the plurality of nonvolatile memory devices are connected to a plurality of channels and the plurality of nonvolatile memory devices constitute a plurality of ways.

12. An operation method of a storage device which includes a plurality of nonvolatile memory devices, the method comprising:

receiving a first write request from a first host;

writing first data of the first host in first nonvolatile memory devices among the plurality of nonvolatile memory devices in response to the first write request;

receiving a second write request from a second host;

writing second data of the second host in second nonvolatile memory devices among the plurality of nonvolatile memory devices in response to the second write request; and performing a garbage collection operation for the first host, wherein the second nonvolatile memory devices include at least some of the first nonvolatile memory devices, and wherein, during the garbage collection operation of the first host, the at least some of the first nonvolatile memory devices included in the second nonvolatile memory devices are not selected as a target of the garbage collection operation.

13. The method of claim 12, wherein the first nonvolatile memory devices satisfy a first performance requirement received from the first host, and wherein the second nonvolatile memory devices satisfy a second performance requirement received from the second host.

14. The method of claim 12, wherein the writing of the first data of the first host includes:

forming a first super block based on a memory block included in each of the first nonvolatile memory devices; and writing the first data in the first super block.

15. The method of claim 12, wherein the performing of the garbage collection operation for the first host includes:

generating a garbage collection group based on remaining nonvolatile memory devices among the first nonvolatile memory devices other than the second nonvolatile memory devices;

forming a second super block based on the garbage collection group; and performing the garbage collection operation for the second super block.

16. The method of claim 12, wherein the first data stored in the second nonvolatile memory devices are invalidated by the first host, and memory blocks storing the invalidated first data store the second data of the second host.

17. A storage device comprising:

a plurality of nonvolatile memory devices; and a storage controller configured to control the plurality of nonvolatile memory devices, wherein the storage controller includes, a host interface circuit configured to communicate with a plurality of hosts, a NAND interface circuit configured to communicate with the plurality of nonvolatile memory devices; and a resource manager configured to allocate the plurality of nonvolatile memory devices to the plurality of hosts, wherein the resource manager is configured to, receive a first performance requirement from a first host among the plurality of hosts; and allocate a 0-th striping group of the plurality of nonvolatile memory devices to the first host, based on the first performance requirement, wherein the resource manager is further configured to, receive a second performance requirement from a second host among the plurality of hosts; and reallocate the plurality of nonvolatile memory devices such that a first striping group of the plurality of nonvolatile memory devices are allocated to the first host and a second striping group of the plurality of nonvolatile memory devices are allocated to the second host, based on the first performance requirement and the second performance requirement, wherein the second striping group includes at least some of nonvolatile memory devices included in the 0-th striping group, and wherein a first part of the nonvolatile memory devices included in the second striping group stores first data of the first host and is not selected as a target of a garbage collection operation for the first host.

18. The storage device of claim 17, wherein the first performance requirement includes information about a first storage capacity and first minimum performance required by the first host, and wherein the second performance requirement includes information about a second storage capacity and second minimum performance required by the second host.

19. The storage device of claim 17, wherein the garbage collection operation for the first host is triggered in response to a physical storage space of the first striping group being insufficient.

20. The storage device of claim 17, wherein the plurality of nonvolatile memory devices are connected to the NAND interface circuit through a plurality of channels and the plurality of nonvolatile memory devices constitute a plurality of ways.

* * * * *